United States Patent [19]
Katoku et al.

[11] Patent Number: 5,289,324
[45] Date of Patent: Feb. 22, 1994

[54] CASSETTE HOLDER WITH MEANS FOR OPENING AND CLOSING THE CLOSURE MEMBER OF A CASSETTE

[75] Inventors: Takashi Katoku, Tokyo; Masafumi Tamura, Kanagawa, both of Japan

[73] Assignee: Sony Corporation, Japan

[21] Appl. No.: 978,170

[22] Filed: Nov. 17, 1992

Related U.S. Application Data

[63] Continuation of Ser. No. 619,518, Nov. 29, 1990, abandoned.

[30] Foreign Application Priority Data

Dec. 6, 1989 [JP] Japan .................. 1-317020

[51] Int. Cl.$^5$ ............................................. G11B 5/008
[52] U.S. Cl. ...................... 360/96.5; 360/93; 360/132
[58] Field of Search ............ 360/93, 96.5, 96.6, 360/132

[56] References Cited

U.S. PATENT DOCUMENTS

| | | | |
|---|---|---|---|
| 4,017,901 | 4/1977 | Starr | 360/132 |
| 4,646,189 | 2/1987 | Sasaki et al. | 360/132 |
| 4,654,729 | 3/1987 | Yaragida et al. | 360/93 |
| 4,706,141 | 11/1987 | Oba et al. | 360/96.6 |
| 4,797,768 | 1/1989 | Oishi et al. | 360/132 |
| 4,933,796 | 6/1990 | Tanaka | 360/132 |
| 4,935,829 | 6/1990 | Sasaki | 360/96.6 |
| 4,965,683 | 10/1990 | Otani | 360/96.6 |
| 5,023,740 | 6/1991 | Sasaki | 360/132 |
| 5,038,236 | 8/1991 | Nakahara et al. | 360/96.5 |
| 5,075,811 | 12/1991 | Goto | 360/130.21 |

FOREIGN PATENT DOCUMENTS

| | | | |
|---|---|---|---|
| 6782487 | 9/1989 | Austria . | |
| 2420818 | 10/1979 | France . | |
| 1323547 | 1/1991 | Japan | 360/96.5 |
| 1323549 | 1/1991 | Japan | 360/96.6 |

OTHER PUBLICATIONS

Patent Abstracts of Japan: vol. 11, No. 287, Sep. 17, 1987 relating to JP-A-62 082 541 (Sudo), Apr. 16, 1987.
Patent Abstracts of Japan: vol. 13, No. 355, Aug. 9, 1989 relating to JP-A-1 113 949 (Sawamura), May 2, 1989.
Patent Abstracts of Japan: vol. 7, No. 23, Jan. 29, 1983 and JP-A-57 176 574 (Shimodaira), Oct. 29, 1982.

Primary Examiner—John H. Wolff
Attorney, Agent, or Firm—Ronald P. Kananen

[57] ABSTRACT

A cassette holder in a recording and/or reproducing apparatus for a magnetic tape cassette includes a pair of circular-arc shaped members which serves to deflect a front pivotal closure member of the magnetic tape cassette to its open position when the magnetic tape cassette is inserted into the cassette holder to be arranged at a fixed position, and a plate member which serves to deflect the front pivotal closure member to its closed position when the magnetic tape cassette arranged at the fixed position is taken out of the cassette holder. The cassette holder is formed by combining two sheet metal members with each other. One of the sheet metal members is integrally formed with the circular-arc shaped members, and the other sheet metal member is integrally formed with the plate member. When the magnetic tape cassette is arranged at the fixed position, the front pivotal closure member is received within a space between the circular-arc shaped member and the plate member.

11 Claims, 22 Drawing Sheets

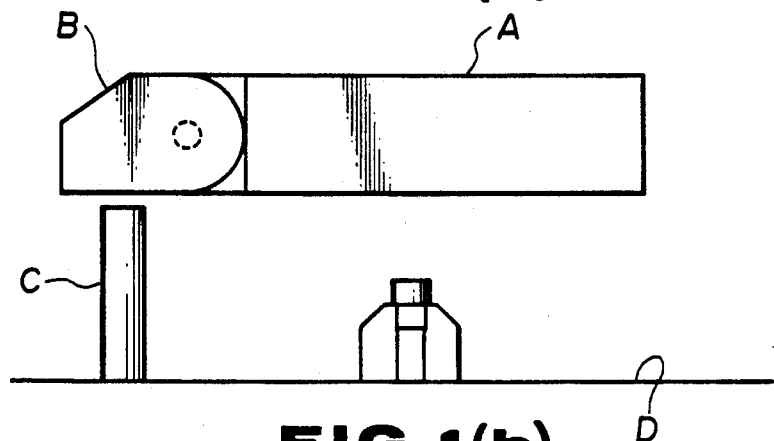
FIG.1(a) PRIOR ART
FIG.1(b) PRIOR ART
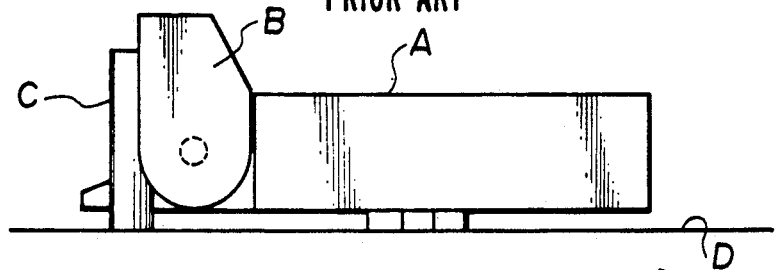
FIG.2(a) PRIOR ART
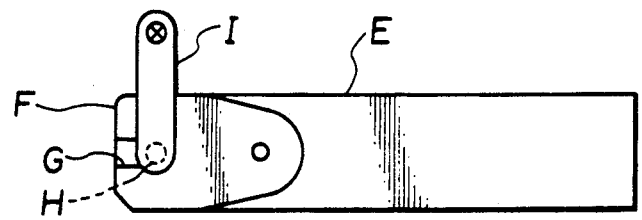
FIG.2(b) PRIOR ART
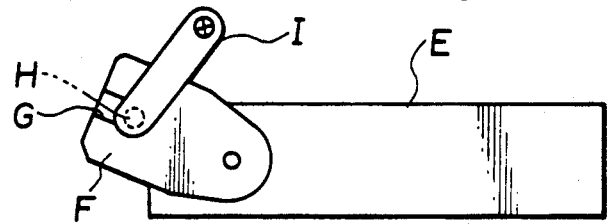
FIG.2(c) PRIOR ART
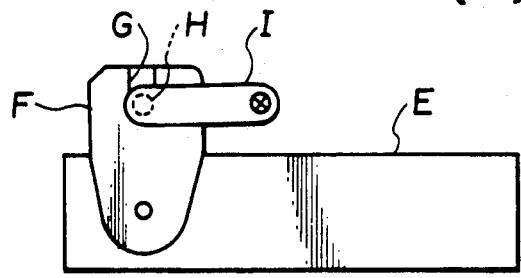

CASSETTE HOLDER WITH MEANS FOR OPENING AND CLOSING THE CLOSURE MEMBER OF A CASSETTE

This application is a continuation of application Ser. No. 07/619,518 filed Nov. 29, 1990, now abandoned.

BACKGROUND OF THE INVENTION

Field of the Invention

The present invention relates generally to a cassette holder for a recording and/or reproducing apparatus. More specifically, the invention relates to a cassette holder used for loading a tape cassette in a recording and/or reproducing apparatus.

Description of the Background Art

Generally, tape cassettes used for recording and/or reproducing apparatus, such as video tape recorders (VTRs) and digital audio tape recorders, have a front lid for covering a through opening formed in the front portion of the tape cassette. In the case of such a tape cassette, while it is not used, the front lid closes the through opening to prevent magnetic tape housed within the tape cassette from being exposed to the outside, and when it is used in the recording and/or reproducing apparatus, the front lid opens the front through opening to allow a head drum of the apparatus to come into contact with the magnetic tape.

FIGS. 1(a) and 1(b) show a tape cassette A which has a front lid B pivotably supported thereon. In order to open and close the front lid B, a lid opening member C projects upwards from the bottom surface of a cassette loaded portion D. When the tape cassette A supported on a cassette holder (not shown) moves from a position shown in FIG. 1(a) toward a loaded position shown in FIG. 1(b), the lid opening member C urges the pivotal free end portion of a front lid B upwards. When the tape cassette A reaches the loaded position, the front lid B reaches its open position. On the other hand, when the tape cassette A returns from the loaded position shown in FIG. 1(b) to the position shown in FIG. 1(a), the front lid B returns the closed position due to spring force applied thereto by biasing means (not shown), usually provided within the cassette.

FIGS. 2(a) to 2(c) show another type of tape cassette E which has a front lid F pivotably supported thereon. The front lid F is formed with a groove G on the outer surface thereof. In addition, a lid opening arm I is pivotably supported on a cassette holder (not shown). When the tape cassette E is inserted into the cassette holder, the pivotal free end portion H of the lid opening arm I engages the groove G of the front lid F as shown in FIG. 2(a). As the tape cassette E is pushed to the position shown in FIG. 2(b) and further to the position shown in FIG. 2(c), the lid opening arm I rotates due to the thrusting force applied to the tape cassette E, so that the front lid F is pulled by means of the pivotal free end portion H of the lid opening arm I to move its open position. On the other hand, when the tape cassette E moves from the position shown in FIG. 2(c) to the position shown in FIG. 2(a), the front lid F returns its closed position due to spring force applied to the lid opening arm I by biasing means (not shown).

Either types of cassette holders must have specific members, such as a lid opening member C, a lid opening arm I, means for applying biasing force to the front lid B, or means for applying biasing force to the lid opening arm I, so that the number of parts is increased. Therefore, there is a disadvantage in that man-hours and cost of assembly are increased. In addition, the second type of cassette holder must have means for returning the front lid to the closed position, there is a disadvantage in that the cassette holders must have means for moving the tape cassette to the cassette loaded position and for stably holding the cassette at the loaded position, and both types of cassette holders require the use of cassettes which have a built-in biasing means, such as a spring for closing the cassette lid when withdrawn from the holder.

SUMMARY OF THE INVENTION

It is therefore a principal object of the present invention to provide a cassette holder for a recording and/or reproducing apparatus, which can itself cause a front lid of a tape cassette to be opened when the tape cassette is inserted into the cassette holder, and to be closed when the tape cassette is taken out of the cassette holder, without the necessity of providing any moving parts or the necessity of providing members which must be attached directly to the recording and/or reproducing apparatus.

It is another object of the present invention to provide a cassette holder which can be used with cassettes in which no internal biasing means is provided for the cassette lid.

It is a further object of the present invention to provide a cassette holder for a recording and/or reproducing apparatus, which can be formed by way of drawing and which can be relatively thick to provide great rigidity for increasing the strength and life of the holder.

In order to accomplish the aforementioned and other objects, a cassette holder in a recording and/or reproducing apparatus for a magnetic tape cassette includes opening means for deflecting a front pivotal closure member of the magnetic tape cassette to its open position when the magnetic tape cassette is inserted into the cassette holder to be arranged at a fixed position, and closing means for deflecting the front pivotal closure member to its closed position when the magnetic tape cassette is taken out of the cassette holder. The cassette holder may be formed by combining two sheet metal members with each other.

According to one aspect of the present invention there is provided, a cassette holder in a recording and/or reproducing apparatus for a magnetic tape cassette which has a front pivotal closure member movable between a closed position at which the front pivotal closure member covers a front opening of the magnetic tape cassette, and an open position at which the front pivotal closure member opens the front opening, the cassette holder comprising: holding means for receiving and holding the magnetic tape cassette at a fixed position within a cassette receptacle defined therein, the holding means being movable between an ejected position at which the magnetic tape cassette is allowed to be inserted into and removed from the holding means, and a loaded position at which cassette loading is completed; opening means for deflecting the front pivotal closure member to the open position depending upon movement of the magnetic tape cassette toward the fixed position while the opening means is in contact with the front pivotal closure member; and closing means for deflecting the front pivotal closure member to the closed position depending upon movement of the magnetic tape cassette in a direction away from the fixed position while the closing means is in contact with the front pivotal closure member.

According to the preferred embodiment of the present invention the opening means includes an essentially circular-arc shaped member integrally formed with the cassette holder, a free end portion of the front pivotal closure member moving along the circular-arc shaped member depending upon movement of the magnetic tape cassette toward the fixed position.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 1(a) and 1(b) are schematic views showing opening and closing positions of a front lid of a conventional tape cassette;

FIGS. 2(a) to 2(c) are schematic views showing opening and closing positions of a front lid of another conventional tape cassette;

DESCRIPTION OF THE PREFERRED EMBODIMENT

A cassette holder, according to the present invention, will be described herebelow in terms of the preferred embodiments in order to facilitate a better understanding of the present invention. The cassette holder of the preferred embodiment can be applied to a recording and/or reproducing apparatus which is designed to record and reproduce a novel, recently proposed magnetic tape cassette.

Because of the rather complicated structure of the preferred embodiments the following disclosure will be made in terms of separate groups of components. Throughout the disclosure, the words "front", "rear", "right" and "left" used with respect to the recording and/or reproducing apparatus mean the bottom and top, and the right and left sides of FIG. 10.

Magnetic Tape Cassette

Figure 3:
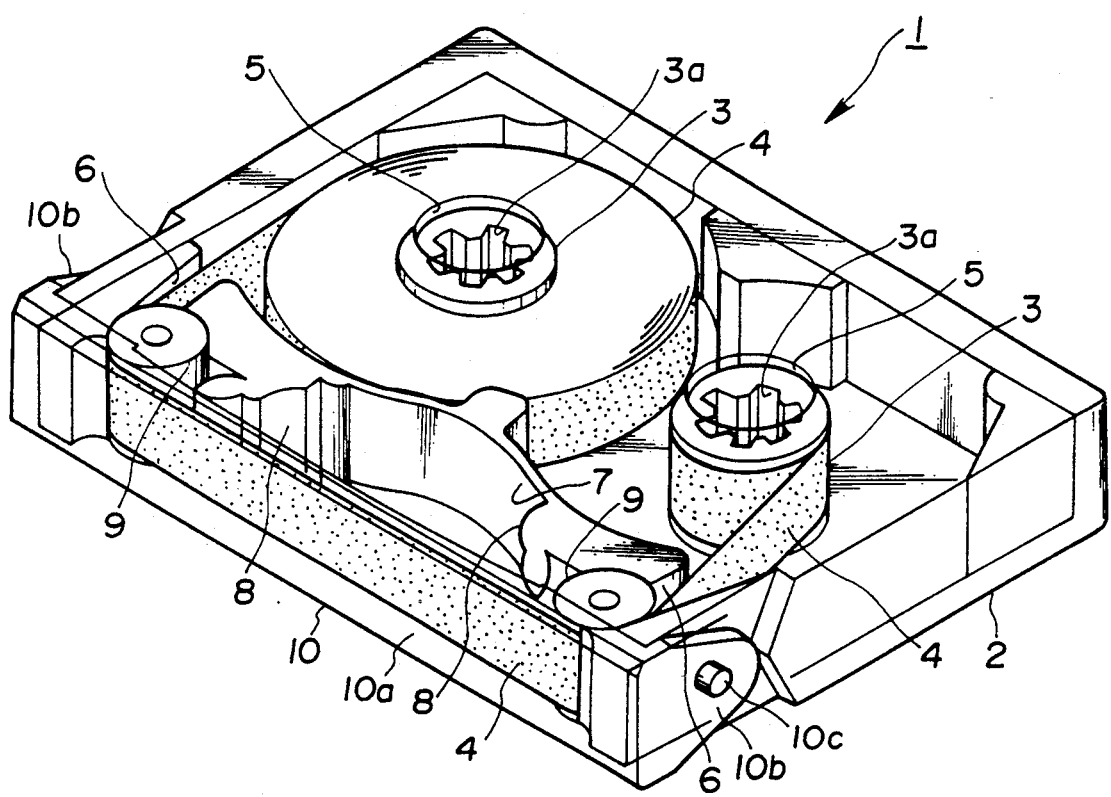
FIG. 3 is a perspective view of a tape cassette which can be applied to the preferred embodiment of a cassette holder, according to the present invention.
Figure 4:
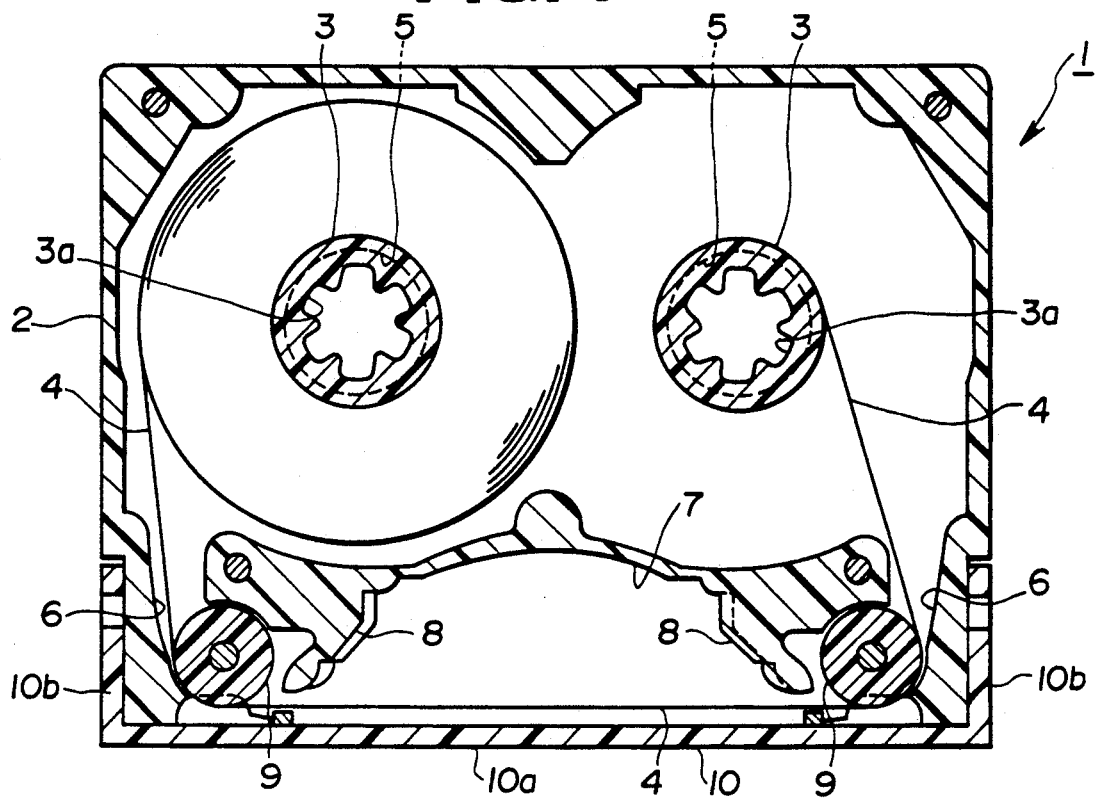
FIG. 4 is a horizontally taken sectional view of the tape cassette of FIG. 3.

Referring now to the drawings, particularly to FIG. 3, there is shown a magnetic tape cassette 1 in a recording and/or reproducing apparatus to which the preferred embodiment of a cassette holder, according to the present invention, can be applied.

The magnetic tape cassette 1 has an essentially rectangular box-shaped cassette casing 2. A pair of tape reels 3 onto which a magnetic tape 4 is wound, are rotatably housed within the cassette casing 2. Each of the tape reels 3 has an engaging bore 3a used for engaging a reel engaged shaft 16 or 16' of the recording and/or reproducing apparatus, which will be described hereinafter. The upper and lower surfaces of the cassette casing 2 respectively have a pair of through openings 5 which face the engaging bores 3a of the tape reels 3, respectively.

The cassette casing 2 has a pair of tape access openings 6 near the front-right and front-left corners of the cassette casing 2. The magnetic tape 4 supplied from one of the tape reels 3 goes out of the interior of the cassette casing 2 through one of the tape access openings 6, to travel along the front plate of the cassette casing 2. Then, the magnetic tape 4 goes into the interior of the cassette casing 2 through the other tape access opening 6, to be wound onto the other tape reel 3.

The cassette casing 2 also has a head drum receiving portion 7 between the tape access openings 6. The head drum receiving portion 7 has a pair of contact surfaces 8 which are designed to come into contact with a head drum of the recording and/or reproducing apparatus to position the magnetic tape cassette 1 relative to the head drum, which will be described hereinlater.

A pair of pinch rollers 9 are rotatably supported on the cassette casing 2 near the tape access openings 6. The magnetic tape 4 is wound onto these pinch rollers 9 to turn its course so as to travel in front of the head drum receiving portion 7 along the front plane of the cassette casing 2 while it is strained between the pinch rollers 9.

Figure 5A:
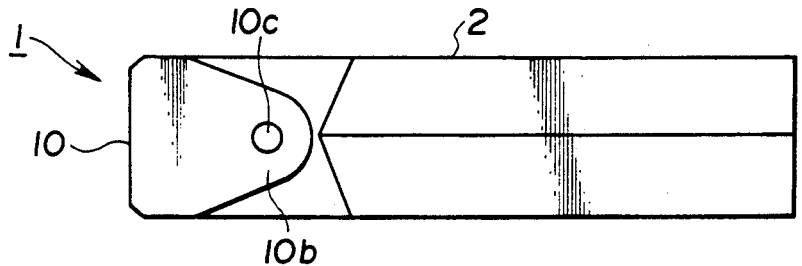
FIGS. 5(a) and 5(b) are side plan views of the tape cassette of FIG. 3, which show opening and closing positions of a front lid of the tape cassette.

The magnetic tape cassette 1 has a front lid 10 which covers a front through opening formed in the front portion of the cassette casing 2. The front lid 10 is made of a resilient synthetic resin, and generally comprises a cover plate portion 10a and a pair of side pieces 10b which extend essentially perpendicular to the cover plate portion 10a from the side edges of the cover plate portion 10a. The side pieces 10b of the front lid 10 are pivotably supported on the side walls of the cassette casing 2 so that the front lid 10 can move between a closed position shown in FIG. 5(a) and an open position shown by the full and/or dotted line of FIG. 5(b).

Figure 5B:
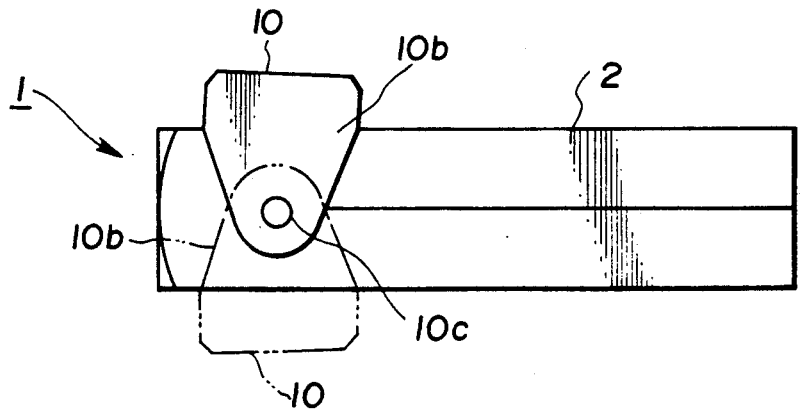

As can be seen clearly from FIG. 5(b), distances between the pivotal axis 10c of the front lid 10 and the front-upper and front-lower corners of the cassette casing 2 are slightly greater than the distance between the pivotal axis 10c and the center of the cover plate portion 10a. Therefore, in a case where the front lid 10 moves between its closed and open positions, the cover plate portion 10a can pass over the front-upper or front-lower edge of the cassette casing 2 by being resiliently distorted to be slightly arched. In addition, the front lid 10 of the cassette can be locked at its closed position without provision of biasing means within the cassette.

Schematic Construction of Recording and/or Reproducing Apparatus (Tape Player)

Figure 6:
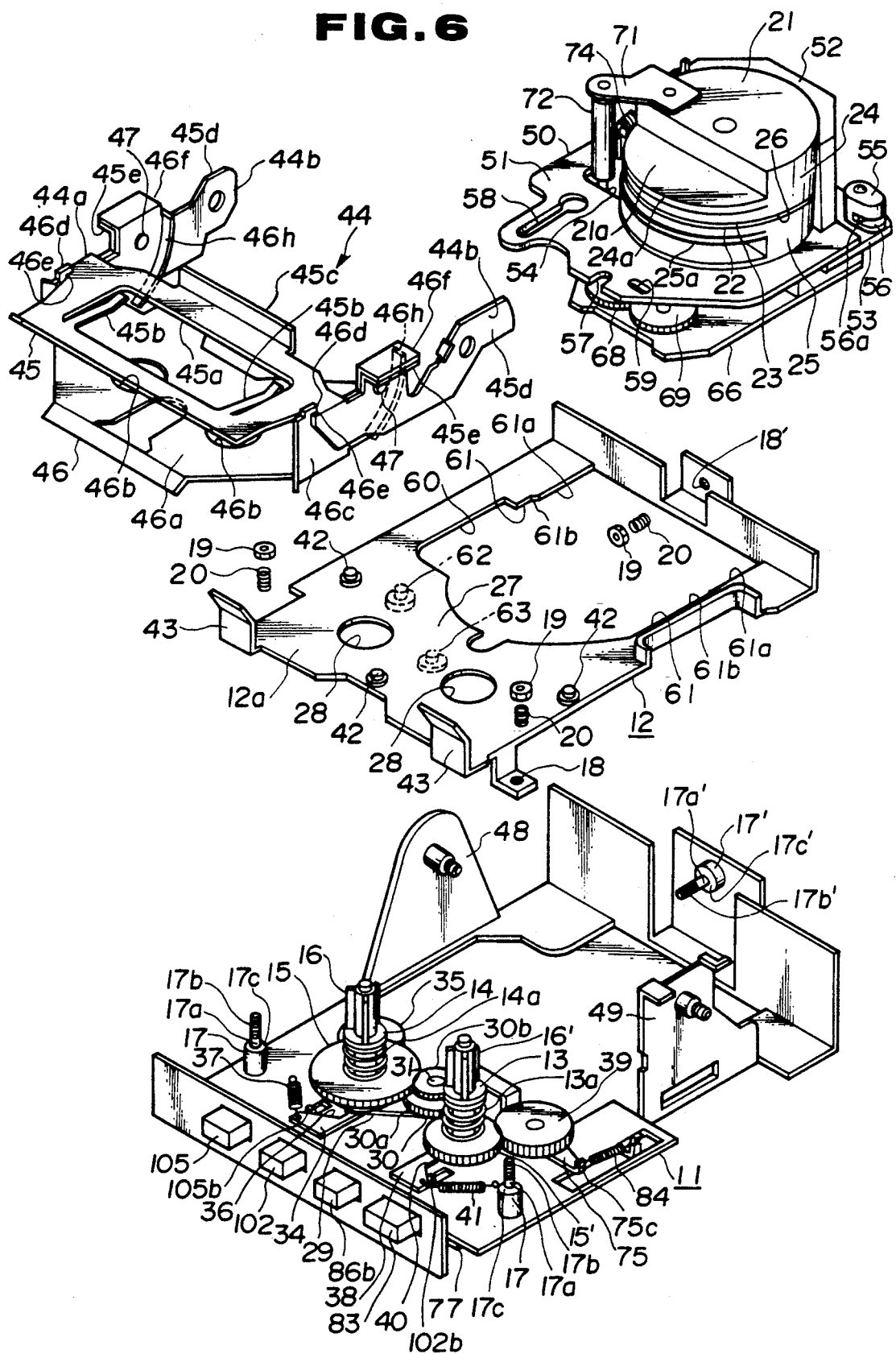
FIG. 6 is an exploded perspective view of a part of a recording and/or reproducing apparatus including the preferred embodiment of a cassette holder, according to the present invention.
Figure 7:
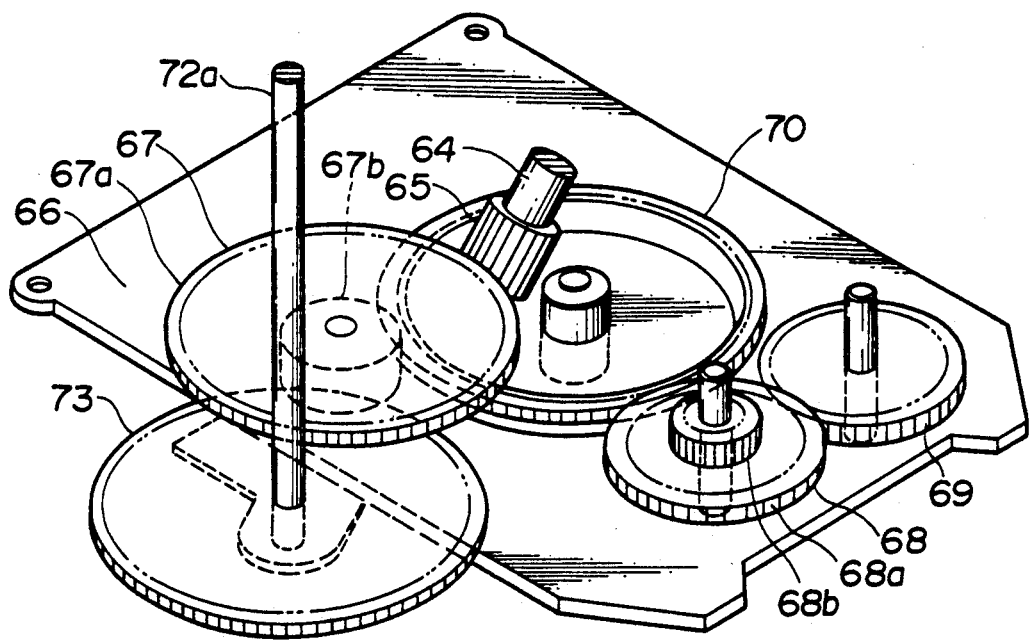
FIG. 7 is a perspective view of a gear base of the recording and/or reproducing apparatus of FIG. 6.

Referring to FIG. 6, there is shown a recording and/or reproducing apparatus, such as a tape player, to which the preferred embodiment of a cassette holder can be applied. The recording and/or reproducing apparatus includes an substantially rectangular main chassis 11 and a sub-chassis 12 fixed to the main chassis 11. The sub-chassis 12 is supported on the main chassis 11 so as to be arranged parallel to the plate portion of the main chassis 11.

A pair of reel tables, i.e. supply and take-up reel tables 13 and 14 are respectively arranged on the upper surface of the plate portion of the main chassis 11 on the front-right and front-left sides of the center thereof so as to be separated from each other by a predetermined distance. The reel tables 13 and 14 are rotatably supported on the main chassis 11, and have respective reel table gears 15 and 15' and reel engaging shafts 16 and 16'. The reel engaging shafts 16 and 16' are respectively connected to the reel table gears 15 and 15' so as to be rotatable by frictional force caused therebetween.

The main chassis 11 is provided with a pair of vertically extending supporting pins 17 which extend from the plate portion thereof in a vertical direction, and a horizontally extending supporting pin 17' which extends from a side wall thereof in a horizontal direction. Each of the supporting pins 17 and 17' comprises a small-diameter portion 17a or 17a', a thread groove portion 17b or 17b' formed on the tip portion of the small-diameter portion 17a or 17a', and a shoulder portion 17c or 17c' for supporting the small-diameter portion 17a or 17a' thereon.

The sub-chassis 12 has through openings 18 and 18' for receiving the small-diameter portions 17a and 17'a of the supporting pins 17 and 17', so that the sub-chassis 12 is supported on the shoulder portions 17c and 17'c. Lock nuts 19 are designed to engage the thread groove portions 17b and 17'b. Compression coil springs 20 are arranged around the small-diameter portions 17a and 17'a between the sub-chassis 12 and the lock nuts 19, so as to thrust the sub-chassis 12 to the shoulder portions 17c and 17'c of the supporting pins 17 and 17'.

Since the sub-chassis 12 is mounted to the main chassis 11 by spring force of the compression coil springs 20, even if the main chassis 11 deforms by stress applied to the mechanical chassis, it is possible to prevent the deformation of the main chassis from being transmitted to the sub-chassis 12, so that the profile regularity of the sub-chassis 12 can be easily maintained.

The front portion of the sub-chassis 12 serves as a cassette loaded portion, at which a magnetic tape cassette 1 is loaded.

A head drum unit 21 is supported on the upper surface of the sub-chassis 12 so as to be movable in a longitudinal direction. The head drum unit 21 generally comprises upper and lower drums 24 and 25, and a middle rotary drum 22 arranged in a space formed between the upper and lower drums 24 and 25. Magnetic heads 23 are supported on the outer periphery of the middle rotary drum 22. On the front portion 21a of the head drum unit 21, the distance between the upper surface of the upper drum 24 and the lower surface of the lower drum 25 is slightly smaller than the up-and-down width of the head drum receiving portion 7 of the tape cassette 1. In addition, on the front portion 21a of the head drum unit 21, projecting edge portions 24a and 25a are respectively formed on the lower edge of the upper drum 24 and the upper edge of the lower drum 25 which project outwardly. Distance between the projecting edge portions 24a and 25a is slightly greater than the width of the magnetic tape 4.

Figure 11:
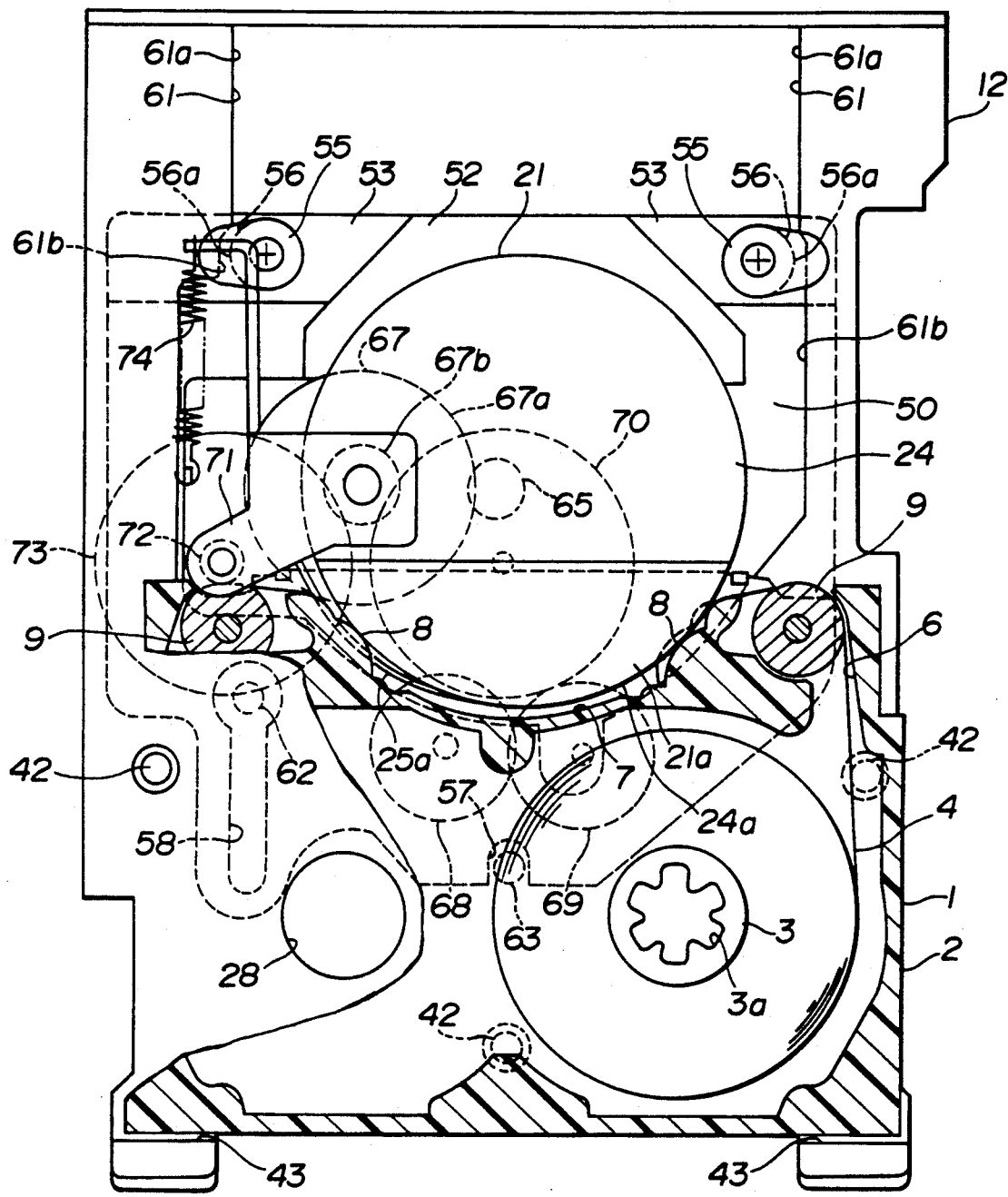
FIG. 11 is a schematic view of the recording and/or reproducing apparatus when a head drum unit is positioned at a first position.
Figure 12:
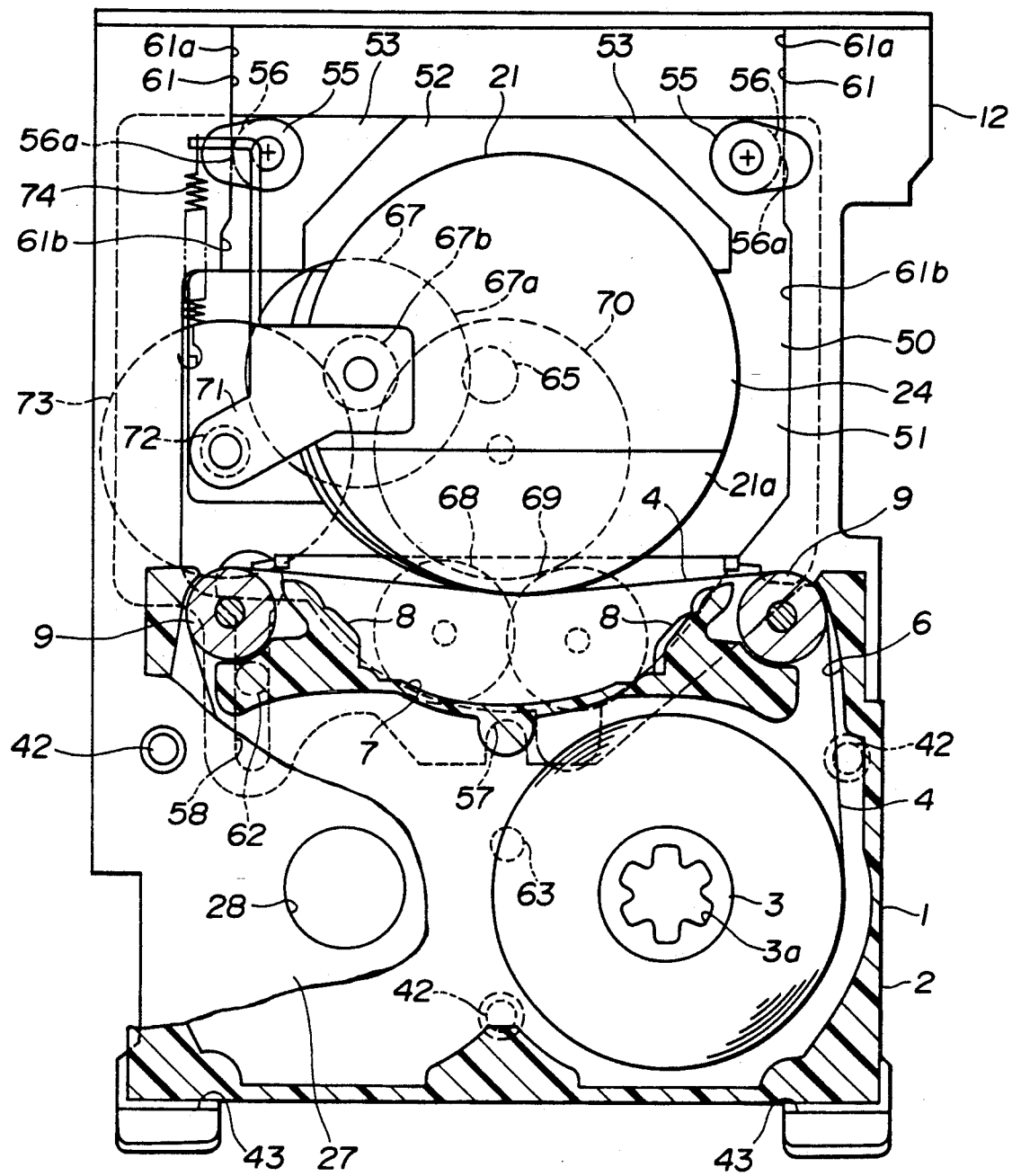
FIG. 12 is a schematic view of the recording and/or reproducing apparatus when the head drum unit is positioned at a second position.
Figure 13:
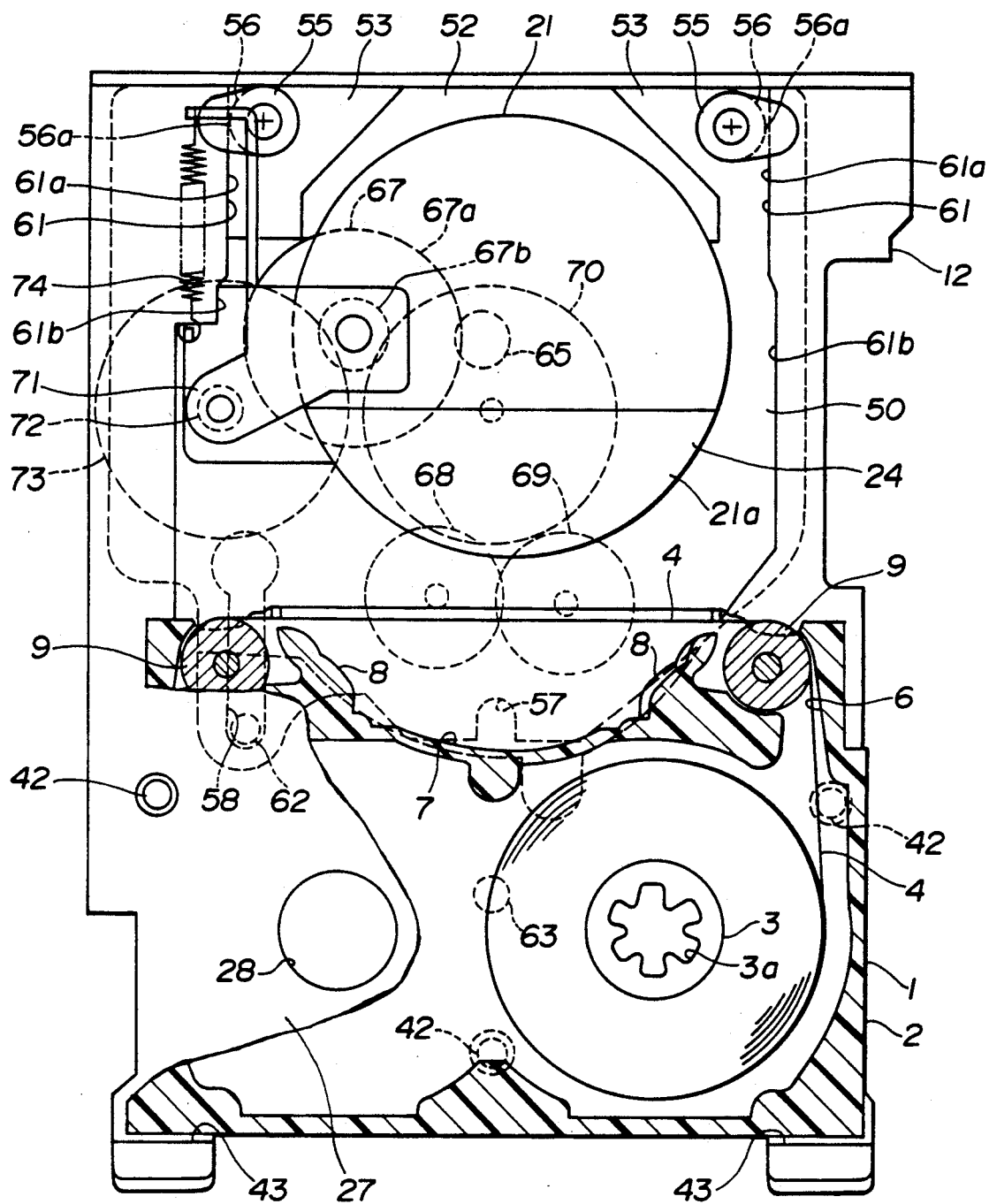
FIG. 13 is a schematic view of the recording and/or reproducing apparatus when the head drum unit is positioned at a third position.

The head drum unit 21 is movable between a first position in which a great part of the front portion 21a of the head drum unit 21 is received within the head drum receiving portion 7 shown in FIG. 11, a second position in which a small part of the front portion 21a is received within the head drum receiving portion 7 shown in FIG. 12, and a third position in which all of the front portion 21a is arranged outside of the head drum receiving portion 7 shown in FIG. 13.

When the head drum unit 21 moves to the first position, the magnetic tape 4 is urged into the head drum receiving portion 7 by means of the head drum unit 21 to be wound onto the head drum unit 21 at a predetermined tape-wrap angle. In this state, recording and/or reproduction on the magnetic tape 4 is performed by means of the head drum unit 21.

When the head drum unit 21 moves to the second position, the magnetic tape 4 is wound onto the head drum unit 21 at a tape-wrap angle smaller than the aforementioned tape-wrap angle at which the recording and/or reproduction are performed. In this state, the recording and/or reproducing apparatus can selectively operate a fast-forward mode (FF mode), a rewind mode (REW mode) or a search mode.

After the head drum unit 21 moves to the third position, the tape cassette 1 can be taken out of the recording and/or reproducing apparatus.

Cassette Loading Portion

Substantially the entire front-half portion of the sub-chassis 12 serves as a cassette loaded portion 27, this refers to the portion occupied by the cassette when the cassette is in a loaded, or engaged position.

Figure 10:
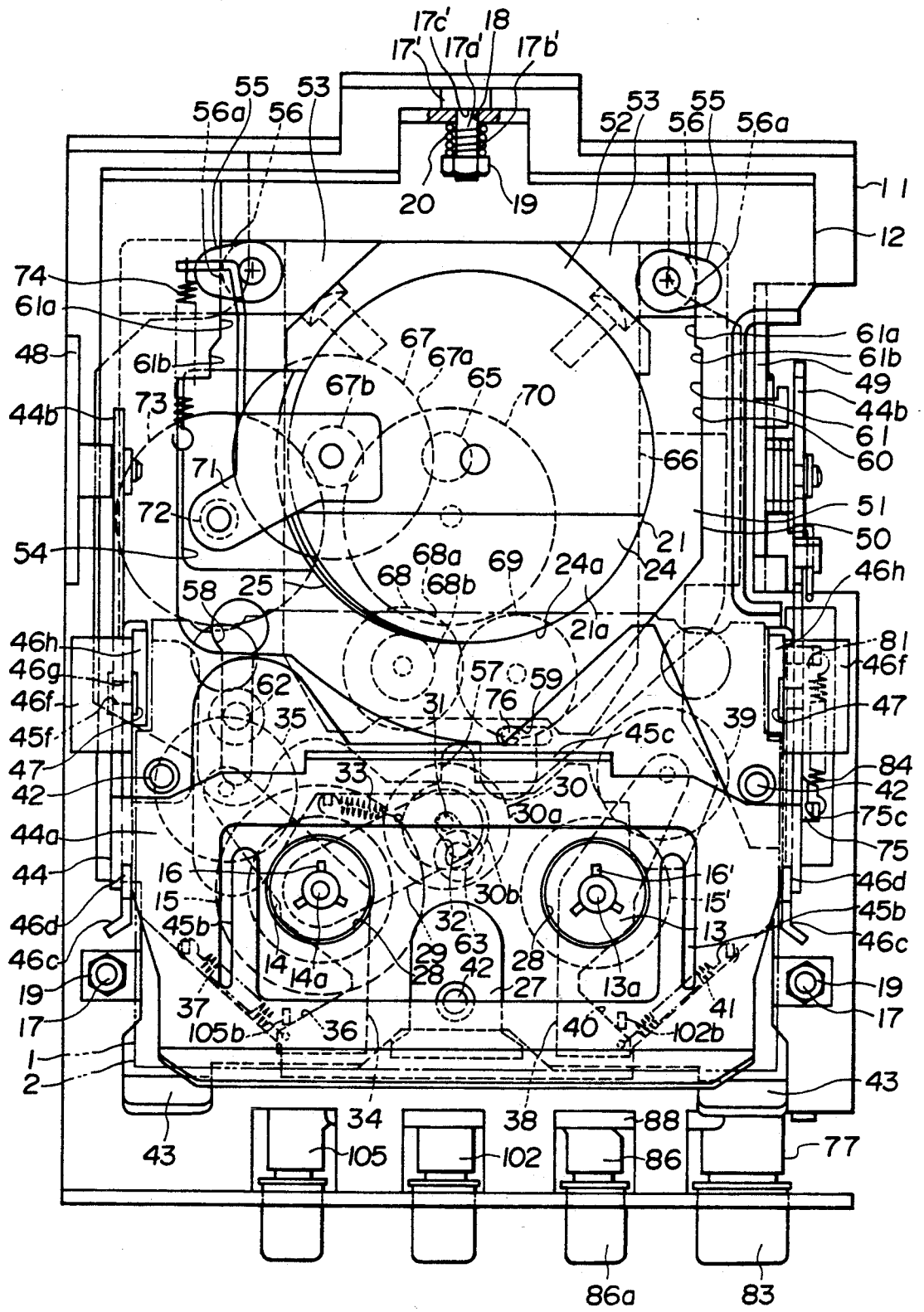
FIG. 10 is an entire plan view of the recording and/or reproducing apparatus of FIG. 6.

Referring to FIG. 10, a pair of through openings 28 are formed in the front portion 12a of the sub-chassis 12 so as to be separated from each other by a predetermined distance in a lateral direction. The reel engaging shafts 16 and 16' of the reel table 13 and 14 pass through the corresponding through openings 28 to project upwards from the upper surface of the sub-chassis 12.

As shown in FIG. 10, a play gear arm 29 is arranged on the upper surface of the main chassis 11.

One end portion of the play gear arm 29 is pivotably supported on a supporting shaft 14a of the reel table 14. On the pivotal free end portion of the play gear arm 29, a play gear 30 is rotatably supported. The play gear 30 comprises a large-diameter gear 30a and a small-diameter gear 30b which are integrally formed with each other. The small-diameter gear 30b always engages the reel table gear 15 of the reel table 14.

The lower end of a supporting shaft 31 of the play gear 30 is received in a circular-arc regulating groove 32 formed in the main chassis 11. The center of the circular-arc regulating groove 32 coincides with the supporting shaft 14a of the reel table 14. By this regulating groove 32, the pivotal range of the play gear arm 29 is regulated.

A tension spring 33 is stretched between the play gear arm 29 and the main chassis 11 so as to bias the play gear arm 29 counterclockwise in FIG. 10. Therefore, when the pivotal free end portion of the play gear arm 29 is not urged from behind, the play gear arm 29 is held at a position in which the lower end of the supporting shaft 31 of the play gear 30 is in contact with the rear end of the regulating groove 32.

A FF gear arm 34 is also arranged on the upper surface of the main chassis 11. A substantially middle portion of the FF gear arm 34 is pivotably supported on the supporting shaft 14a of the reel table 14. A FF gear 35 is rotatably supported on the rear end portion of the FF gear arm 34. The FF gear 35 always engages a small-diameter gear 15a of the reel table gear 15. The left edge of the front end of the FF gear arm 34 extends in a rear-right direction to serve as a cam edge 36. A tension spring 37 is stretched between the FF gear arm 34 and the main chassis 11 so as to bias the FF gear arm 34 in a clockwise direction, as shown in FIG. 10.

In addition, a REW gear arm 38 is arranged on the upper surface of the main chassis 11. Substantially middle portion of the REW gear arm 38 is pivotably supported on a supporting shaft 13a of the reel table 13. A REW gear 39 is rotatably supported on the rear end portion of the REW gear arm 38. The REW gear 39 always engages the reel table gear 15'. The right edge of the front end portion of the REW gear arm 38 extends in rear-left direction to serve as a cam edge 40. A tension spring 41 is stretched between the REW gear arm 38 and the main chassis 11 so as to bias the REW gear arm 38 in a counterclockwise direction, as shown in FIG. 10.

These gear arms 34 and 38 rotate by operating an operating lever which will be described hereinlater, so that the recording and/or reproducing apparatus can selectively operate in a FF mode, a search mode and a REW mode in which the reel tables 13 and 14 rotate at a high speed.

The cassette loaded portion 27 is provided with three cassette supporting pins 42 which project upwards from the upper surface of the sub-chassis 12. The tape cassette 1 is supported on the upper surfaces of the cassette supporting pins 42.

The cassette loaded portion 27 is also provided with a pair of regulating pieces 43 which project vertically from the right and left end of the front edge of the sub-chassis 12, respectively. When the tape cassette 1 is loaded in the cassette loading portion 27, the rear surface of the tape cassette 1 comes into contact with the regulating pieces 42 so that the tape cassette 1 can be positioned in the main chassis 11.

Cassette Holder

Figure 8:
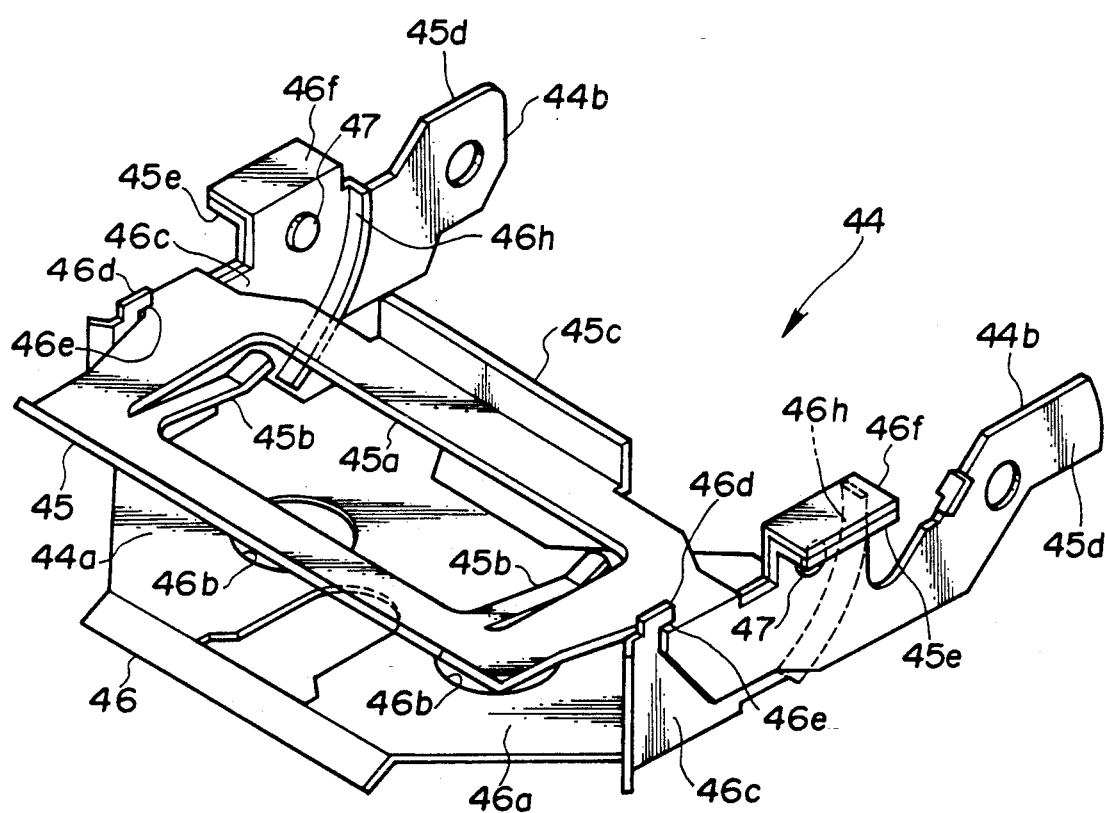
FIG. 8 is a perspective view of the cassette holder shown in FIG. 6.
Figure 9:
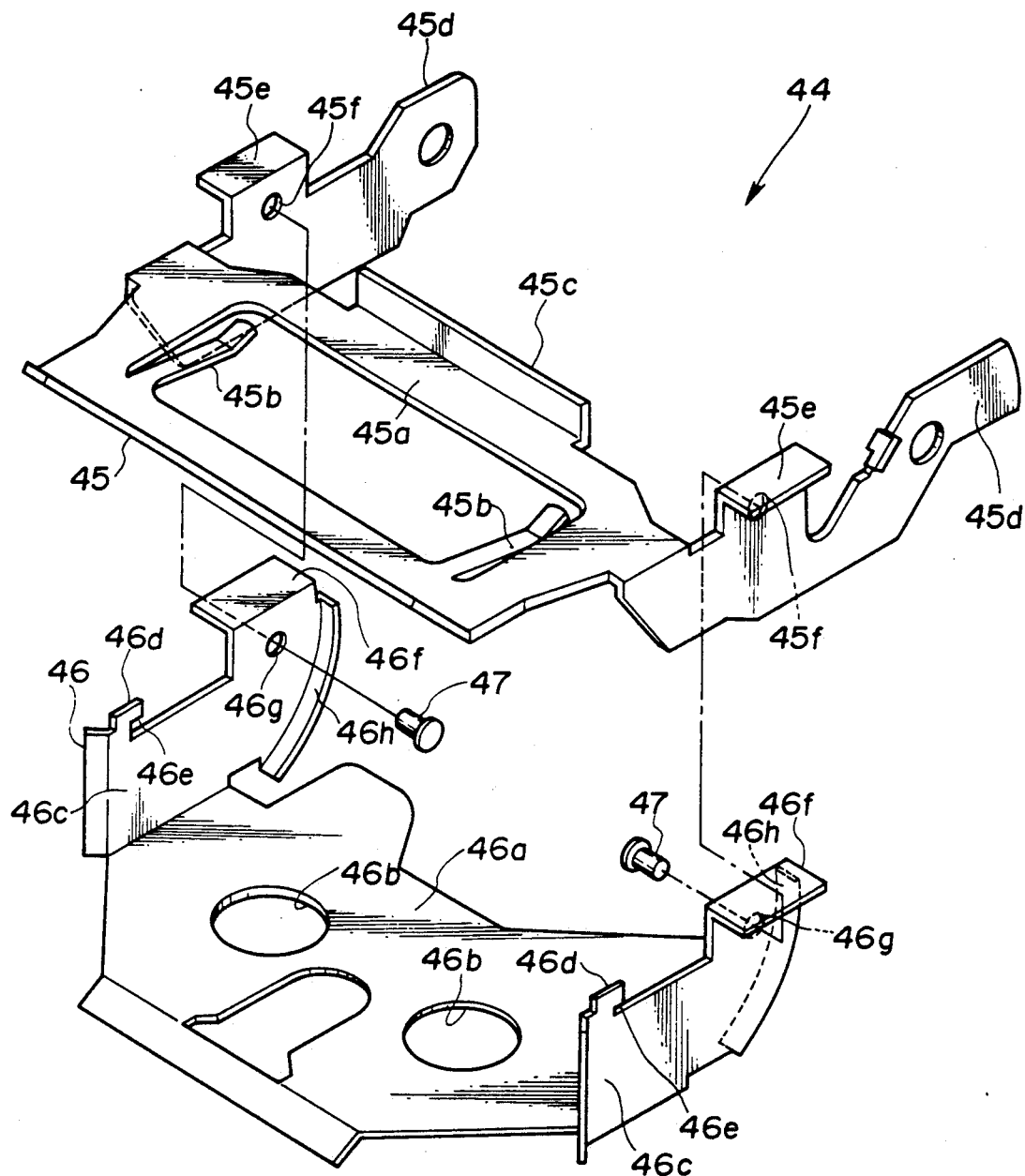
FIG. 9 is an exploded perspective view of the cassette holder of FIG. 8.

As shown in FIG. 8, a cassette holder 44 generally comprises a substantially rectangular cross-sectioned cassette holding portion 44a and a pair of arms 44b which extend rearwards from the rear ends of both side walls of the cassette holding portion 44a. As can be seen clearly from FIG. 9, the cassette holder 44 comprises upper and lower sheet metal frame members 45 and 46.

The upper sheet metal frame member 45 has a sufficient thickness for holding its rigidity. The upper sheet metal frame member 45 generally comprises a roof frame portion 45a, a pair of thrusting pieces 45b, a lid returning piece 45c, a pair of arm portions 45d and a pair of connecting pieces 45e. These portions are integrally formed with each other. The roof frame portion 45a is essentially a rectangular frame. The thrusting pieces 45b extend rearwards from the right and left end portions of the front edge of an through opening of the upper frame portion 45a. The thrusting pieces 45b are arranged to be inclined so that the levels of the rear end portions thereof become slightly lower than that of the roof frame portion 45a, and the rear ends of the thrusting pieces 45b are slightly bent upwards. The lid returning piece 45c extends upwards from a portion other than both ends of the rear edge of the roof frame portion 45a. The front edge of the roof frame portion 45a is slightly bent upwards. The upper edges of the front ends of the arm portions 45d are respectively connected to the rear end portions of the right and left edges of the roof frame portion 45a so that the arm portions 45d extend rearwards. The connecting pieces 45e extend upwards from the upper edges of the arm portions 45d at locations neighboring the roof frame portion 45a. The upper end portions of the connecting pieces 45e are bent outwards. The side walls of the connecting pieces 45e are formed with mounting openings 45f, respectively.

The lower sheet metal frame member 46 is made from a thinner sheet metal material than that of the upper sheet metal frame member 45 in consideration of manufacturing conditions, such as drawing conditions. The lower sheet metal frame member 46 generally comprises a bottom plate portion 46a and a pair of side plate portions 46c. The bottom plate portion 46a has a pair of through openings 46b which are separated from each other by a predetermined distance in a lateral direction. The front edge portion of the bottom plate portion 46a is bent to be inclined slightly downwards. The side plate portions 46c extend upwards from both side edges of the bottom plate portion 46a. Forward portions of the lower edges of the side plate portions 46c are integrated with the side edges of the bottom plate portion 46a. A pair of engaging pieces 46d extends upwards from the front end portions of the upper edges of the side plate portions 46c. The respective engaging pieces 46d have a cut-out which extends along the upper edge of the corresponding side plate portion 46c. A pair of connecting pieces 46f project upwards from the rear portions of the upper edges of the side plate portions 46c. The upper end portions of the connecting pieces 46f are bent outwards. The side walls of the connecting pieces 46f have a mounting opening 46g, respectively. In addition, a pair of circular arc-shaped guide portions 46h are formed on the rear edges of the side plate portions 46c so as to extend inwardly from the rear edges of the respective side plate portions 46c.

Figure 14:
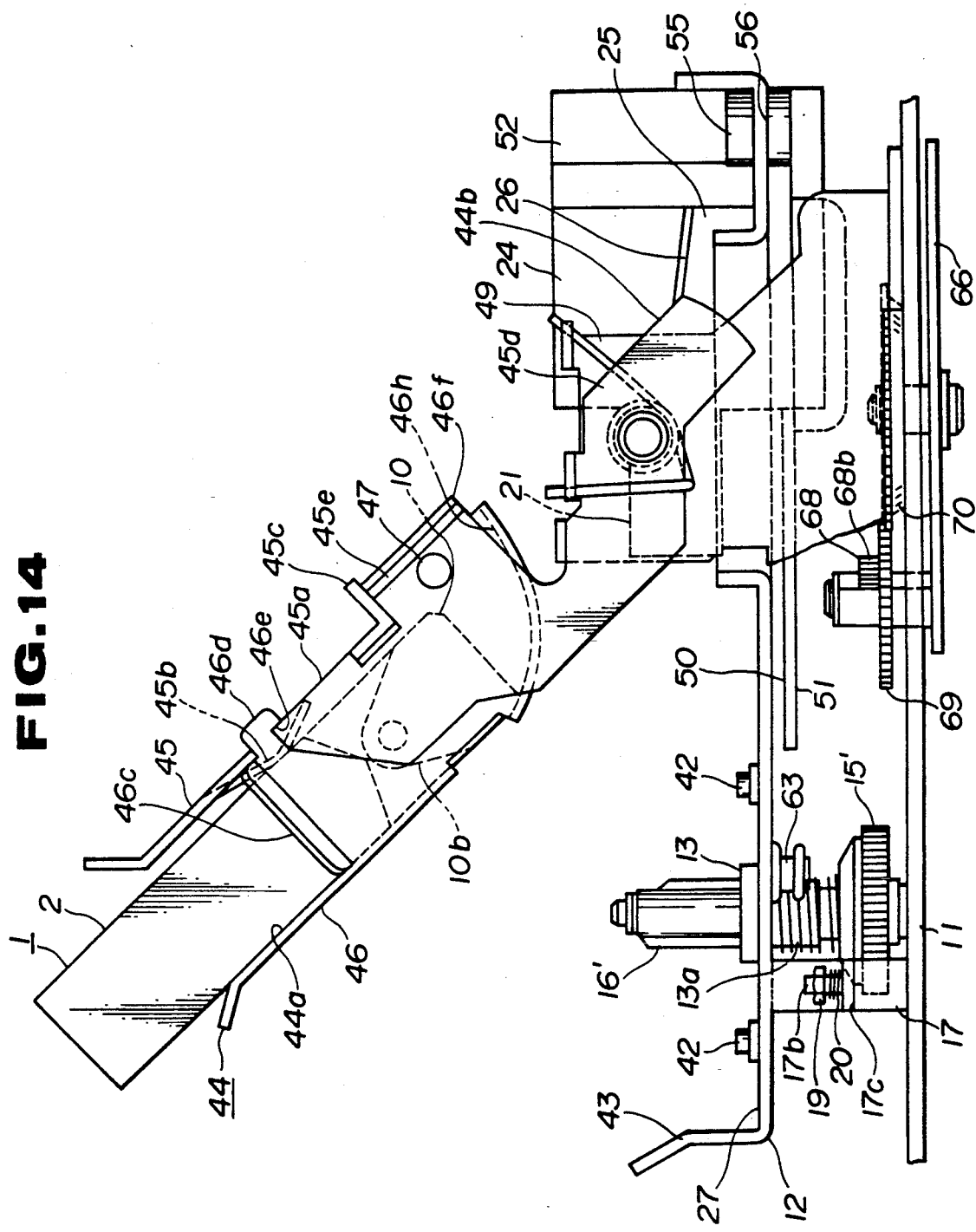
FIG. 14 is a side plan view of main portion of the recording and/or reproducing apparatus when the cassette holder is positioned at an ejected position.
Figure 15:
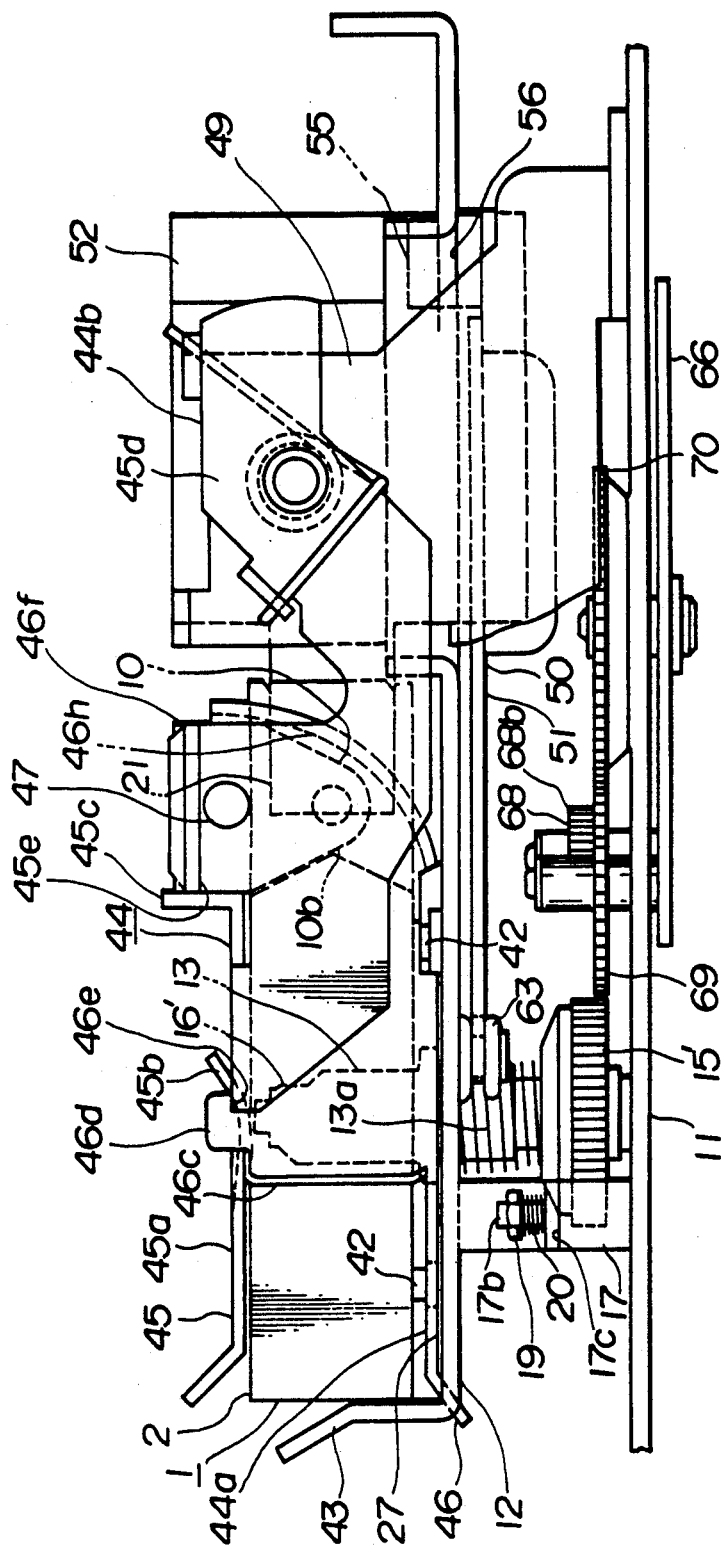
FIG. 15 is a side plan view of main portion of the recording and/or reproducing apparatus when the cassette holder is positioned at a cassette loaded position.
Figure 16A:
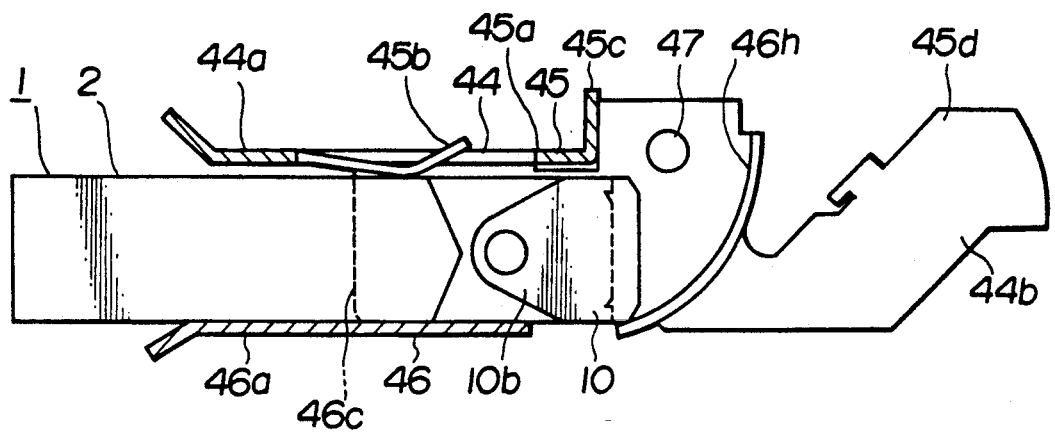
FIGS. 16(a) to 16(f) are schematic views of cassette holder, which show conditions of the front lid of the tape cassette after the tape cassette is inserted into the cassette holder.
Figure 16B:
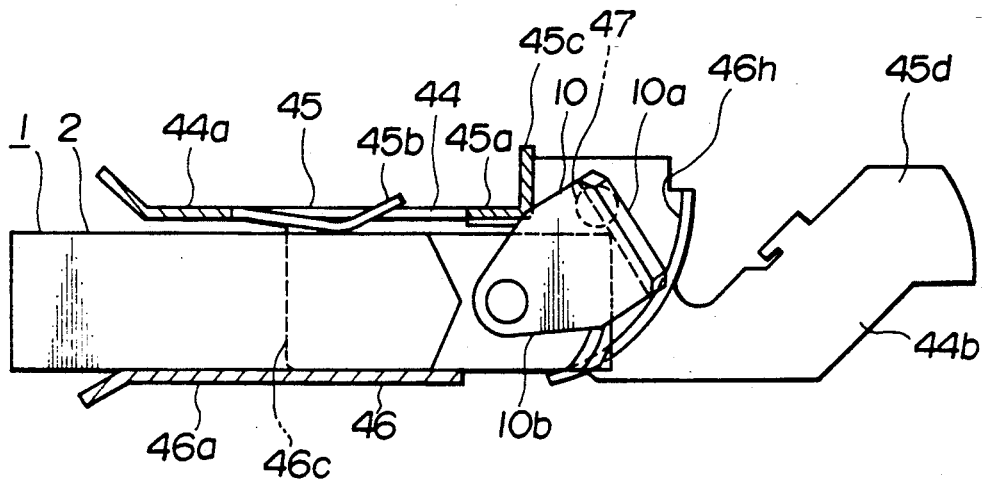
Figure 16C:
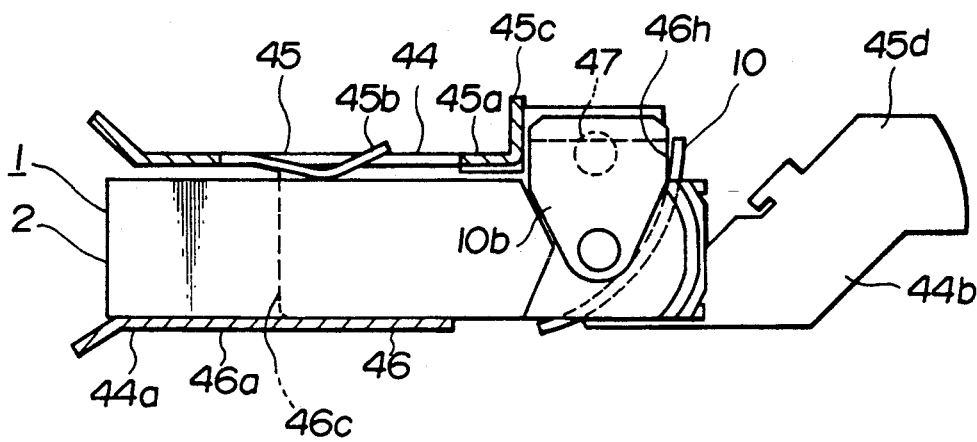
Figure 16D:
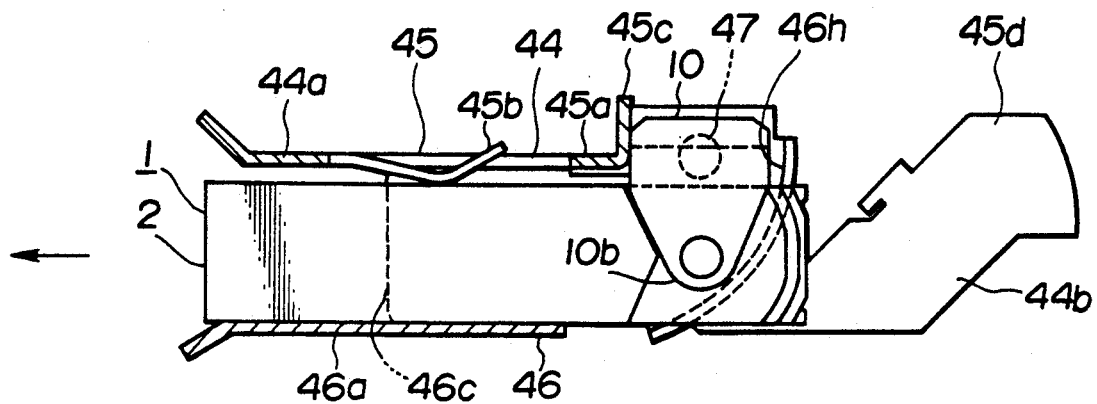
Figure 16E:
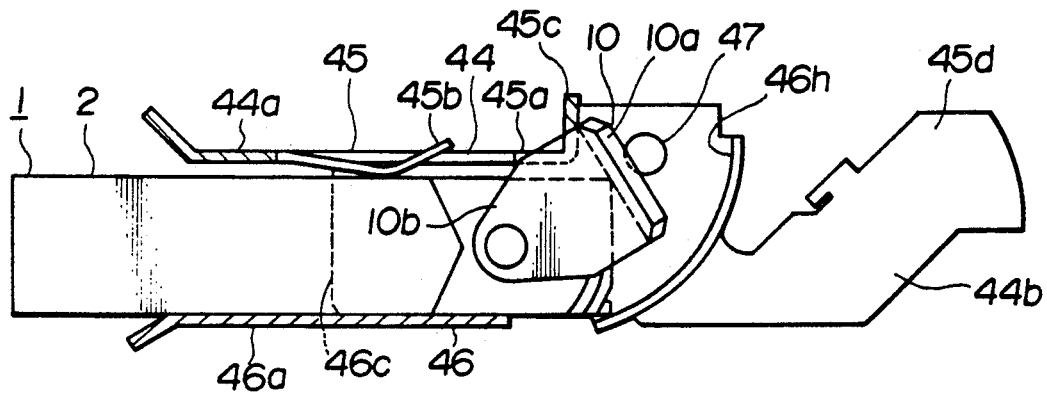
Figure 16F:
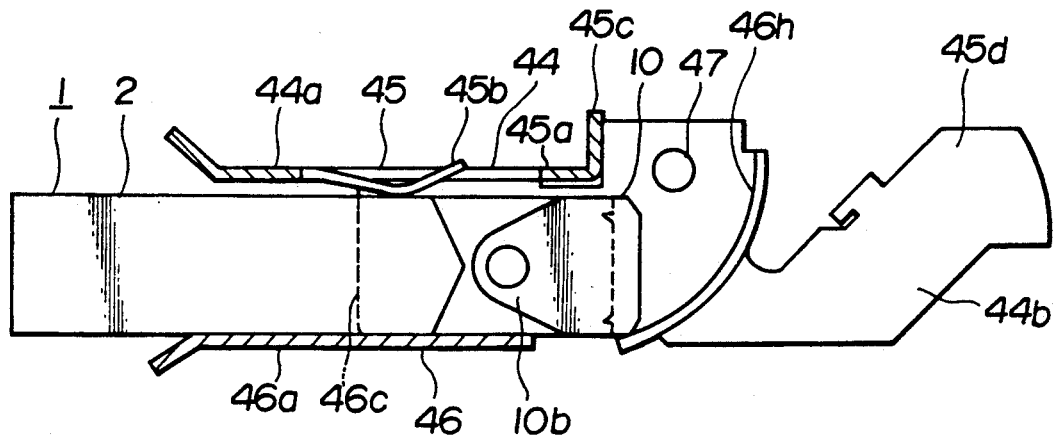

As can be seen clearly from FIG. 8, the upper and lower sheet metal frame members 45 and 46 are connected to each other. That is, the side plate portions 46c of the lower sheet metal frame member 46 are arranged on the inner surfaces of the corresponding arm portions 45d of the upper sheet metal frame member 45, and the connecting pieces 45e are arranged on the upper surfaces of the corresponding connecting pieces 46f. At this time, the cut-outs 46e of the lower sheet metal frame member 46 engage the roof plate portion 45a of the upper sheet metal frame member 45. Then, rivets 47 are passed through the mounting openings 45f and 46g facing each other, and caulking of the rivets 47 are performed. In this way, two sheet metal frame members 45 and 46 are connected to each other so that the cassette holder 44 is formed. The arm portions 45d of this cassette holder 44 are pivotably supported on supporting walls 48 and 49 (see FIG. 6) which extend upwards from both side edges of the main chassis 11, so that the cassette holder 44 can move between an ejected position as shown in FIG. 14 and a loaded position as shown in FIG. 15.

When the tape cassette 1 is inserted into the cassette holding portion 44a when the cassette holder 44 is at the ejected position, first, both end portions of the lower edge of the front lid 10 come into contact with the guide portions 46h. When the tape cassette 1 is further urged into the cassette holding portion 44a, both end portions of the front lid 10 of the cassette are caused to move upwards by means of the guide portions 46h, so that the front lid 10 rotates to its open position. When the front lid 10 reaches its open position, the lid returning piece 45c formed on the rear edge of the roof plate portion 45a of the cassette holding portion 44a nearly comes into contact with the front lid 10. Therefore, when the tape cassette 1 is taken out of the cassette holding portion 44a, the front lid 10 is urged by the lid returning piece 45c of the cassette holding portion 44a to return the lid 10 to its closed position.

As mentioned above, when the cassette holder 44 rotates downwardly after the tape cassette 1 is inserted into the cassette holding portion 44a, the tape cassette 1 is loaded in the cassette loading portion 27. That is, the reel engaging shafts 16 and 16' of the reel tables 13 and 14 engage the engaging bores 3a of the tape reels 3 of the tape cassette 1 via the through openings 46b of the cassette holder 44, and the lower surface of the cassette casing 2 is supported on the upper surfaces of the cassette supporting pins 42.

Head Drum Support

Referring to FIG. 6 a drum base assembly 50 on which the head drum unit 21 is mounted, is supported on the sub-chassis 12 so as to be movable in a longitudinal direction of the main chassis 11. The drum base assembly 50 generally comprises a sliding plate 51 and a supporting block 52 fixed thereto.

A pair of connecting pieces 53 project to the right from the rear-right portion of the supporting block 52 and to the left from the rear-left portion thereof, respectively. The sliding plate 51 has a cut-out 54 which extends rearwards. The rear-right and rear-left corners of the sliding plate 51 are fixed to the connecting pieces 53 of the supporting block 52. A pair of sliding members 55 made of a synthetic resin are fixed to the upper surfaces of the connecting pieces 53. Each of the sliding members 55 has a sliding groove 56 which opens outward. The sliding plate 51 also has a slit 57 which extends rearwards from the central portion of the front edge of the sliding plate 51 to open forward. The sliding plate 51 also has a long through opening 58 and another through opening 59 both of which are arranged at locations neighboring the front edge of the sliding plate 51 and extend in longitudinal and lateral directions, respectively.

As shown in FIG. 6, the sub-chassis 12 has a through opening 60 which occupies a great part of the rear portion of the sub-chassis 12. Both side edges 61 of the through opening 60 extend in a longitudinal direction essentially parallel to each other to serve as guiding edges. Rear portions 61a of the guiding edges 61 project slightly in an inward direction so that the distance between the rear portions 61a is substantially equal to the distance between bottom surfaces 56a of the sliding grooves 56, and the distance between front portions 61b of the guiding edges 61 is slightly greater than the distance between the bottom surfaces 56a of the sliding grooves 56.

The sliding grooves 56 of the drum base assembly 50 slidably engage the guiding edges 61 of the sub-chassis 12. In addition, guiding pins 62 and 63 fixed to the sub-chassis 12 slidably engage the long through opening 58 and the slit 57, respectively. In this way, the drum base assembly 50 is supported on the sub-chassis 12 so as to be slidable in a longitudinal direction.

When the sliding grooves 56 engage the rear portions 61a of the guide edges 61, there is little lateral movement of the drum base assembly 50 since the guiding edges 61 are nearly in contact with the bottom surfaces 56a of the sliding grooves 56. On the other hand, when the sliding grooves 56 engage the front portions 61b of the guide edges 61, the drum base assembly 50 can move slightly in a lateral direction since there is a slight space between the guiding edges 61 and the bottom surfaces 56a of each of the sliding grooves 56.

The head drum unit 21 is driven by means of a drum motor 64. The middle drum 22 and a rotor 64b are fixed to a rotating shaft 64a of the drum motor 64. A rotor magnet 64c is fixed to the rotor 64b, and a stator 64d is arranged to face the rotor 64b. In addition, a stator coil 64e is arranged to face the rotor magnet 64c, and a back yoke 64f is fixed to the rotating shaft 64a so as to face the rotor 64b via the rotor 64d.

The lower end of the rotating shaft 64a which projects downwardly from the lower end of the motor 64, is integrally formed with a driving gear 65. A gear base 66 is arranged beneath the drum base assembly 50 so that the rear end portion of the gear base 66 is fixed to the lower end of the supporting block 52 of the drum base assembly 50. A transmitting gear 67 is arranged on the upper surface of the gear base 66 to be rotatably supported on the gear base 66. The transmitting gear 67 comprises a large-diameter gear 67a and a small-diameter gear 67b which are integrally formed. The large-diameter gear 67a engages the driving gear 65. A pair of relay gears 68 and 69 are also arranged on the upper surface of the gear base 66 near the front end thereof.

The relay gears 68 and 69 are rotatably supported on the gear base 66 so as to engage each other. The relay gear 68 is used when the magnetic tape 4 travels forwards, and the relay gear 69 is used when it is rewound onto the reel table. These relay gears 68 and 69 will be hereinlater referred to as "FWD relay gear" and "REW relay gear", respectively. The FWD relay gear 68 comprises a large-diameter gear 68a and a small-diameter gear 68b which are concentrically and integrally formed with each other. The large-diameter gear 68a of the FWD relay gear 68 engages the small-diameter gear 67b of the transmitting gear 67 via a linkage gear 70 rotatably supported on the gear base 66. Therefore, when the drum motor 64 rotates, the two relay gears 68 and 69 rotate reversely to each other.

A capstan arm 71 is pivotably supported on the upper drum 24 and the gear base 66. The pivotal axis of the capstan arm 71 coincides with the rotation axis of the transmitting gear 67. The pivotal free end portion of the capstan arm 71 rotatably supports a capstan 72. The lower end portion of the shaft 72a of the capstan 72 is fixed to the center of a capstan gear 73 which mates with the small-diameter gear 67b of the transmitting gear 67, so that the capstan 72 rotates by rotation of the drum motor 64. A tension spring 74 is stretched between the capstan arm 71 and the drum base 50 so as to bias the capstan arm 71 in a counterclockwise direction, as shown in FIG. 10.

When the drum base assembly 50 moves forward and the head drum unit 21 is positioned at the first position, the sliding grooves 56 of the drum base assembly 50 engage the front portions 61b of the guiding edges 61, so that the drum base assembly 50 can move slightly in a lateral direction. Therefore, in a process in which the projecting edge portions 24a and 25a of the head drum unit 21 are urged to the contact surfaces 8 of the tape cassette 1, the head drum unit 21 can adjust its position for itself. Therefore, only the accuracy of the contact surfaces 8 of the tape cassette 1 need be considered, for the relative position between the magnetic tape 4 and the head drum unit 21 to be accurately regulated.

In addition, when the head drum unit 21 moves toward the first position, the capstan 72 comes into contact with the pinch roller 9 of the tape cassette 1, which is arranged nearer to the tape reel 3 which engages the reel engaging shaft 16 of the take-up reel table 14, via the magnetic tape 4, and then, until the head drum unit 21 reaches the first position, the capstan 74 moves slightly in a rearward direction relative to the tape cassette 1 so that the tension spring 74 expands slightly. Therefore, the capstan 72 is pressed against the pinch roller 9 via the magnetic tape 4 by spring force of the tension spring 74.

Operating Mechanism

Figure 18:
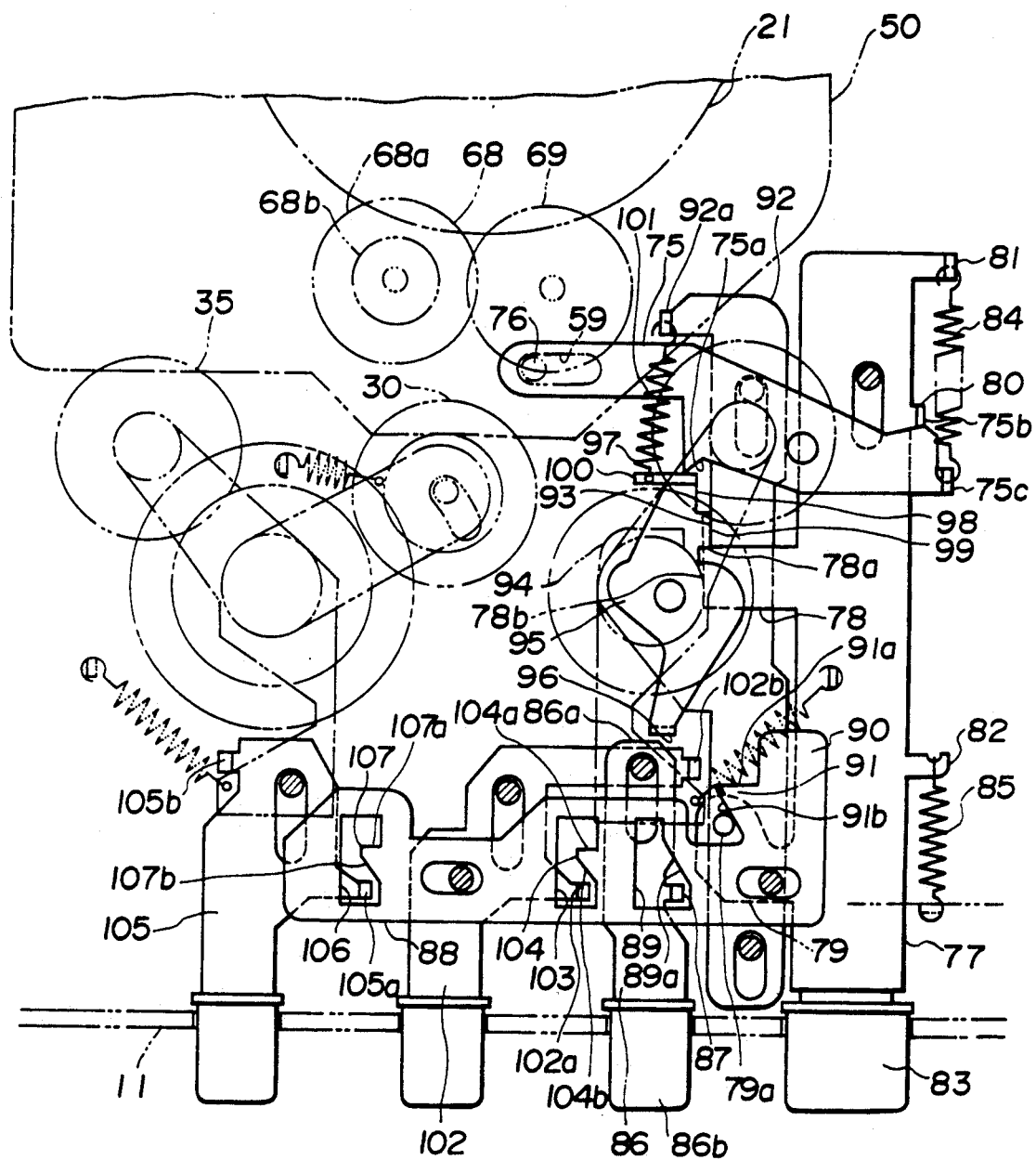
FIG. 18 is a schematic plan view of the recording and/or reproducing apparatus when none of the operating pushbuttons have been operated.

As can be seen clearly from FIG. 18, a drum moving lever 75 is so arranged as to extend laterally. A substantially middle portion of the drum moving lever 75 is pivotably supported on the main chassis 11. A connecting pin 76 projects upwards from the left end portion of the drum moving lever 75, and slidably engages the through opening 59 of the drum base assembly 50. When the drum moving lever 75 rotates, the connecting pin 76 moves in a substantially longitudinal direction of the main chassis 11, so that the drum base assembly 50 or the head drum 21 is designed to move in a longitudinal direction. A thrusted portion 75a is formed on the front edge of the drum moving lever 75 on the left side of the pivotal axis of the drum moving lever 75. A stopper edge 75b is formed on the rear edge of the right end portion of the drum moving lever 75, and a spring peg 75 is also formed on the right end portion of the drum moving lever 75.

A PLAY lever 77 is supported on the main chassis 11 so as to be slidable in a longitudinal direction. The PLAY lever 77 has a thrusting piece 78 which projects to the left from a substantially middle portion thereof. The thrusting piece 78 has a thrusting edge 78a which is inclined at the rear-left corner thereof, and a holding edge 78b which extends in a longitudinal direction at the left end portion thereof. The PLAY lever 77 also has an arm piece 79 which projects to the left from a location neighboring the front edge thereof. The arm piece 77 has a locked pin 79a which projects vertically from the end portion thereof. In addition, the PLAY lever 77 has a stopper piece 80 which projects to the right from a location neighboring the rear end of the right edge, a spring peg 81 which projects to the right from the rear end of the right edge thereof, and a spring peg 82 which projects to the right from a location neighboring the front end of the right edge. Furthermore, a push-button 83 is attached to the front end of the PLAY lever 77.

A tension spring 84 is stretched between the spring peg 75c of the drum moving lever 75 and the spring peg 81 of the PLAY lever 77 so that the drum moving lever 75 is biased in a counterclockwise direction, as seen in FIG. 16. When no force for rotating the drum moving lever 75 clockwise is applied thereto, the stopper edge 75b of the drum moving lever 75 is maintained in contact with the stopper piece 80 of the PLAY lever 77, so as to regulate the position of the drum moving lever 75. In addition, a tension spring 85 is stretched between the spring peg 82 of the PLAY lever 77 and the main chassis 11 so that the PLAY lever 77 is biased in a forward direction.

Figure 19:
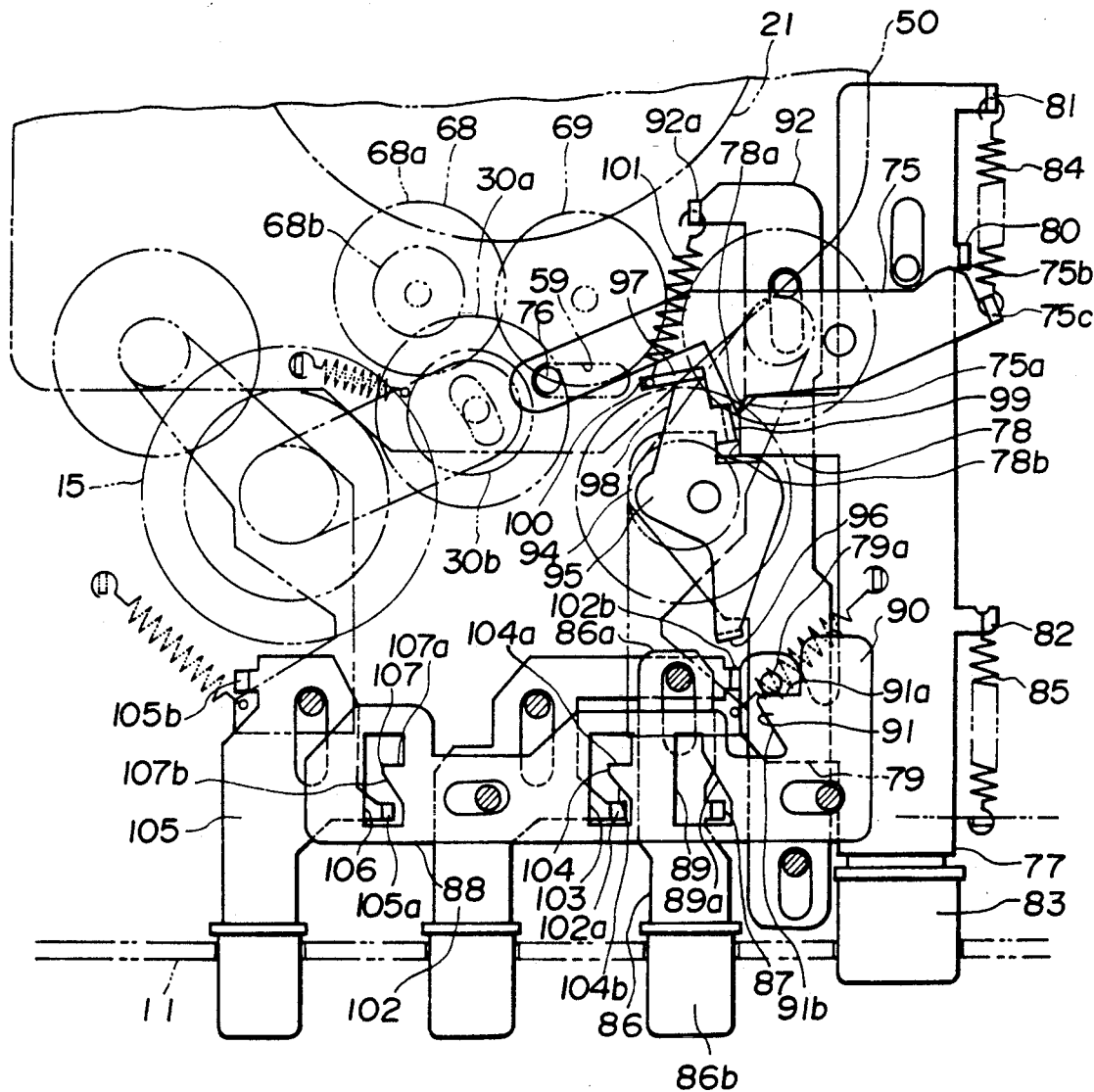
FIG. 19 is a schematic plan view of the recording and/or reproducing apparatus when it operates a recording and/or reproduction mode.
Figure 20:
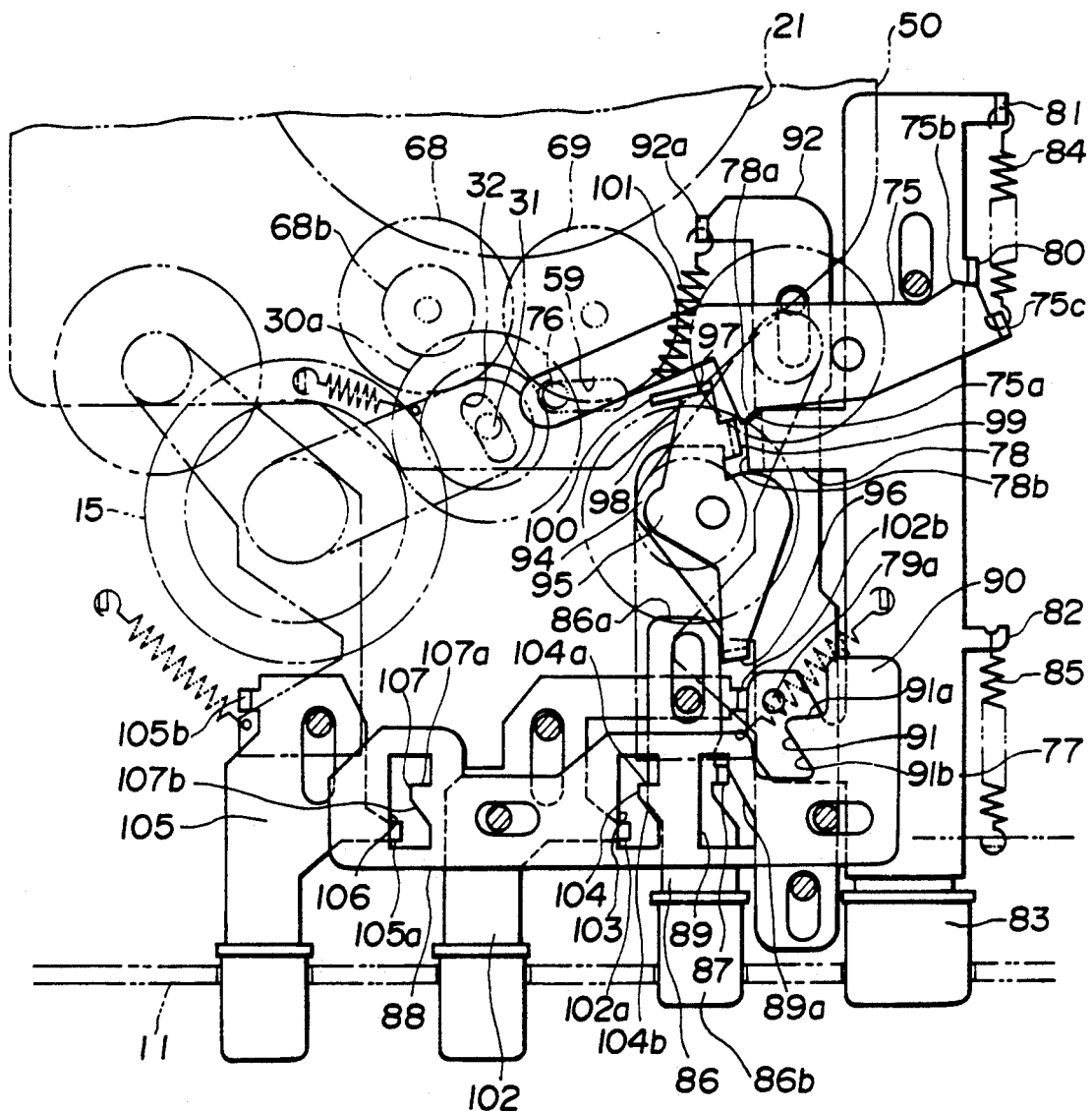
FIG. 20 is a schematic plan view of the recording and/or reproducing apparatus when a STOP/EJECT button is pushed in the recording and/or reproduction mode.

As shown in FIG. 18, when the PLAY lever 77 is not pushed, the drum moving lever 75 is so arranged as to extend in a substantially right-and-left direction, so that the head drum unit 21 is positioned at the second position. On the other hand, as shown in FIG. 19, when the PLAY lever 77 is pushed rearwards, the right end of the drum moving lever 75 is pulled rearwards by means of the PLAY lever 77 via the tension spring 84, so that the drum moving lever 75 rotates in a counterclockwise direction, as shown in FIG. 19, thereby the head drum unit 21 moves to the first position, i.e. the front position. Furthermore, before a lock is released, the PLAY lever 77 is held at the rear position shown in FIG. 19 by means of a lock lever which will be hereinlater described, so that the head drum unit 21 is held at the first position.

A STOP/EJECT lever 86 is supported on the main chassis 11 on the left side of the PLAY lever 77 so as to be slidable in a longitudinal direction of the main chassis 11. The STOP/EJECT lever 86 has a thrusting projection 87 which projects to the right from a substantially middle portion of the right edge. The STOP/EJECT lever is biased in the forward direction by a biasing means (not shown). The rear end edge of the STOP/EJECT lever 86 serves as a thrusting edge 86a. Furthermore, a push-button 86b is attached to the front end of the STOP/EJECT lever 86.

A lock lever 88 is arranged near the front edge of the main chassis 11 so as to extend laterally. The lock lever 88 is supported on the main chassis 11 so as to be slidable in the lateral direction of the main chassis 11, and is biased to the left by a biasing means (not shown). The lock lever 88 has a through opening 89 slightly to the right of the center thereof. The through opening 89 extends in a longitudinal direction of the main chassis 11. The right edge of the through opening 89 is formed with a thrusted edge 89a which extends to be inclined in a rear-left direction.

The thrusting projection 87 of the STOP/EJECT lever 86 is arranged within the through opening 89 of the lock lever 88, and is substantially in contact with a front portion of the right edge of the through opening 89. When the STOP/EJECT lever 86 is pushed in the rearward direction, the thrusted edge 89a of the lock lever 88 is urged rearwards by means of the thrusting projection 87, so that the lock lever 88 is moved to the right against the biasing force applied thereto. On the other hand, when the STOP/EJECT lever 86 returns its initial position due to the biasing force applied thereto, the lock lever 88 is moved to the left due to the biasing force applied thereto to return its initial position.

The lock lever 88 has a projecting piece 90 which projects rearwards from the right end portion thereof. The projecting piece 90 has a locking claw 91 which projects to the left from the left edge thereof. The rear edge 91a of the locking claw 91 serves as a locking edge which extends in a lateral direction of the mechanical chassis 11, and the front edge 91b thereof serves as a thrusted edge which extends to be inclined in the rear-left direction.

Figure 17:
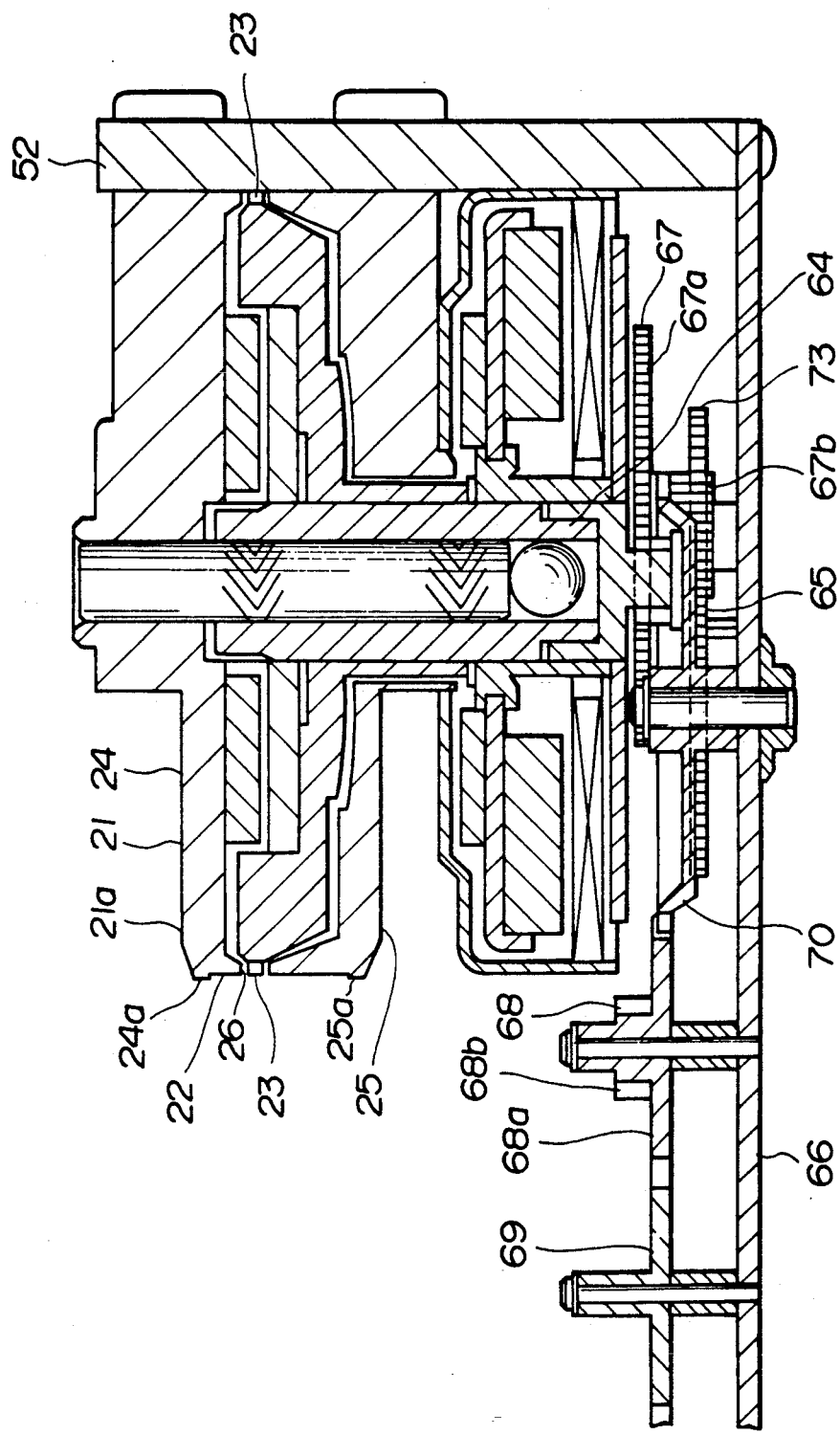
FIG. 17 is a sectional view of a head drum and gears on the gear base of FIG. 7.

While the PLAY lever 77 is positioned at the inactive, or not-pushed position shown in FIG. 16, the locked pin 79a of the PLAY lever 77 is in contact with the front portion of the thrusted edge 91b. When the PLAY lever 77 is pushed rearwards, the thrusted edge 91b of the lock lever 88 is urged rearwards by the locked pin 79a, so that the lock lever 88 is moved to the right. Then, when the PLAY lever 77 reaches the pushed position shown in FIG. 17, the locked pin 79a disengages from the thrusted edge 91b to be so arranged as to face the locking edge 91a, so that the lock lever 88 is moved to the left by the biasing force applied. As a result, if the force for urging the PLAY lever 77 rearwards is released, the locked pin 79a engages the locking edge 91b of the lock lever 88, so that the PLAY lever 77 is locked in the pushed position.

When the STOP/EJECT lever 86 is pushed rearwards after the PLAY lever 77 is locked in the pushed position, the lock lever 88 is moved to the right as mentioned above, and the PLAY lever 77 disengages from the locking edge 91a, so that the PLAY lever 77 returns its not-pushed position by the biasing force of the tension spring 85.

A supporting lever 92 is arranged between the PLAY lever 77 and the STOP/EJECT lever 86 to extend in a longitudinal direction of the main chassis 11. The supporting lever 92 is supported on the main chassis 11 so as to be slidable in a longitudinal direction of the main chassis 11, and is biased in the forward direction by biasing means (not shown). The supporting lever 92 has a stopper edge 93 which is arranged behind a stopper piece 94 slightly to the rear of the center of the left edge of the supporting lever 92. The stopper piece 94, attached to the supporting lever 92, projects to the left from a substantially central portion of the left edge of the supporting lever 92.

A relay lever 95 is pivotably supported on the stopper piece 94 of the supporting lever 92 at a substantially central portion thereof. The relay lever 95 extends in a substantially longitudinal direction of the main chassis 11. The relay lever 95 has a thrusted piece 96 which projects downwards from the front end thereof, and a thrusting piece 97 which projects upwards from the rear end thereof. The relay lever 95 also has a regulating piece 99 which extends downwards from a substantially central position of the right edge of a rear piece 98 of the relay lever 95.

In addition, the relay lever 95 has a spring peg 100 which projects to the left from the left end of the thrusting piece 97. A tension spring 101 is stretched between the spring peg 100 and the spring peg 92a formed on the rear end of the supporting lever 92 so that the relay lever 95 is biased clockwise in FIG. 18. Therefore, the relay lever 95 is positioned at a relay position in which the regulating piece 99 is in contact with the left surface of the stopper edge 93 of the supporting lever 92 so as to cause the relay lever 95 to extend in a substantially longitudinal direction of the main chassis 11. When the supporting lever 92 is positioned at its forward position and the relay lever 95 is positioned at the relay position, the thrusting edge 78a of the PLAY lever 77, positioned at the not-pushed position, is in contact with the front end of the regulating piece 99 of the relay lever 95.

When the PLAY lever 77 is moved toward its pushed position from the aforementioned position, the regulating piece 99 of the relay lever 95 is urged in a rear-left direction by means of the thrusting edge 78a, so that the relay lever 95 rotates counterclockwise against the spring force of the tension spring 101. When the PLAY lever 77 is further moved rearwards, the regulating piece 99 comes into contact with the holding edge 78b of the PLAY lever 77 while the relay lever 95 is held at an non-relay position in which the relay lever 95 rotates slightly counterclockwise from the relay position.

When the relay lever 95 is positioned at the relay position, the thrusted piece 96 thereof closely faces the thrusting edge 86a of the STOP/EJECT lever 86, and the thrusting piece 97 thereof closely faces the thrusted portion 75a of the drum moving lever 75. On the other hand, when the relay lever 95 is positioned at the non-relay position, the thrusted piece 96 is offset to the right from the movement locus of the thrusting edge 86a of the STOP/EJECT lever 86, and the thrusting piece 97 is offset to the left from the movement locus of the thrusted portion 75a of the drum moving lever 75.

In a case where the recording and/or reproducing apparatus operates in the recording and/or reproduction mode, when the PLAY lever 77 is pushed causing the head drum unit 21 to move to the first or forward position, when the STOP/EJECT lever 86 is pushed rearwards in order to remove the recording and/or reproducing mode, the lock lever 88 is moved to the left, i.e. toward the lock releasing position while the thrusting edge 86a does not come into contact with the thrusted piece 96 of the relay lever 95, the PLAY lever 77 returns its not-pushed position, so that the head drum unit 21 returns the second or rearward position and the relay lever 95 returns the relay position.

On the other hand, in a case where the PLAY lever 77 is positioned at the not-pushed position, when the STOP/EJECT lever 86 is pushed rearwards, the thrusted piece 96 of the relay lever 95 positioned at the relay position is urged rearwards by means of the thrusting edge 86a, so that the relay lever 95 is moved rearwards together with the supporting lever 92. During this action, since the thrusted portion 75a of the drum moving lever 75 is urged in a substantially rearward direction by means of the thrusting piece 97 of the relay lever 95, the drum moving lever 75 rotates clockwise in FIG. 18 against the spring force of the tension spring 84, so that the head drum unit 21 is moved to the third position. In addition, locking of the cassette holder 44 due to the locking means (not shown) is removed, and the cassette holder 44 is moved to the ejected position by the biasing means (not shown). When the cassette holder 44 reaches the eject position, the drum base assembly 50 is locked, so that the head drum unit 21 is held at the third position until the cassette holder 44 returns the loading position.

Furthermore, such a locking of the drum base assembly 50 can be accomplished by various means. For example, the lock lever 88 may be formed with a locking claw for locking the STOP/EJECT lever 86 to the pushed position, and a cam may causes the lock lever 88 to move in a lock releasing direction when the cassette holder 44 moves to the loaded position.

A REW lever 102 is arranged on the left side of the STOP/EJECT lever 86. The REW lever 102 is supported on the main chassis 11 so as to be slidable in a longitudinal direction of the main chassis 11, and is biased in the forward direction by biasing means (not shown). The REW lever 102 has a locked piece 102a and a thrusting piece 102b which project to the right.

The lock lever 88 has a through opening 103 which extends in a longitudinal direction of the main chassis 11 on the left side of the through opening 89. The through opening 103 has a locking claw 104 which projects to the left from the right edge thereof. The rear edge 104a of the locking claw 104 extends in a lateral direction of the main chassis 11 to serve as a locking edge, and the front edge 104b of the locking claw 104 extends in a rear-left direction to serve as a thrusted edge.

The locked piece 102a of the REW lever 102 is arranged within the through opening 103 of the lock lever 88. When the REW lever 102 is positioned at the not-pushed position as shown in FIG. 18, the locked piece 102a is arranged in front of the locking claw 104, i.e. the locked piece 102a faces the thrusted edge 104b. When the REW lever 102 is pushed rearwards, the thrusted edge 104b of the locking claw 104 is urged rearwards by means of the locked piece 102a, so that the lock lever 88 is moved to the right. Then, when the REW lever 102 reaches the pushed position shown in FIG. 22, the locked piece 102a disengages from the thrusted edge 104b to be arranged behind the thrusted edge 104b, and the lock lever 88 moves to the left due to the biasing force applied thereto, so that the locking edge 104a is arranged in front of the locked piece 102a. As a result, if the force for pushing the REW lever 102 rearwards is removed, the locked piece 102a engages the locking edge 104a, so that the REW lever 102 is locked at the pushed position.

When the REW lever 102 moves from the not-pushed position to the pushed position, the thrusting piece 102b moves in the rearward direction of the cam edge 40 of the REW gear arm 38 to allow the REW gear arm 38 to rotate counterclockwise due to the spring force of the tension spring 41, so that the REW gear 39 mates with the relay gear 69. On the other hand, when the REW lever 102 returns from the pushed position to the not-pushed position, the thrusting piece 102b urges the cam edge 40 of the REW gear arm 38 in the forward direction, so as to cause the REW gear arm 38 to rotate clockwise against the spring force of the tension spring 41, so that the REW gear 39 disengages from the relay gear 69.

A FF lever 105 is arranged on the left side of the REW lever 102. The FF lever 105 is supported on the main chassis 11 so as to be slidable in a longitudinal direction of the main chassis 11, and is biased in the forward direction by biasing means (not shown). The FF lever 105 has a locked piece 105a which projects to the right from a substantially central portion of the right edge of the FF lever 105, and a thrusting piece 105b which projects to the left from the rear end portion of the left edge of the FF lever 105.

The lock lever 88 also has a through opening 106 which extends in a longitudinal direction of the main chassis 11 on the left side of the through opening 103. The through opening 106 has a locking claw 107 which projects to the left from the right edge thereof. The rear edge 107a of the locking claw 107 extends in a lateral direction of the main chassis 11 to serve as a locking edge, and the front edge 107b of the locking claw 107 extends in a rear-left direction to serve as a thrusted edge.

Figure 23:
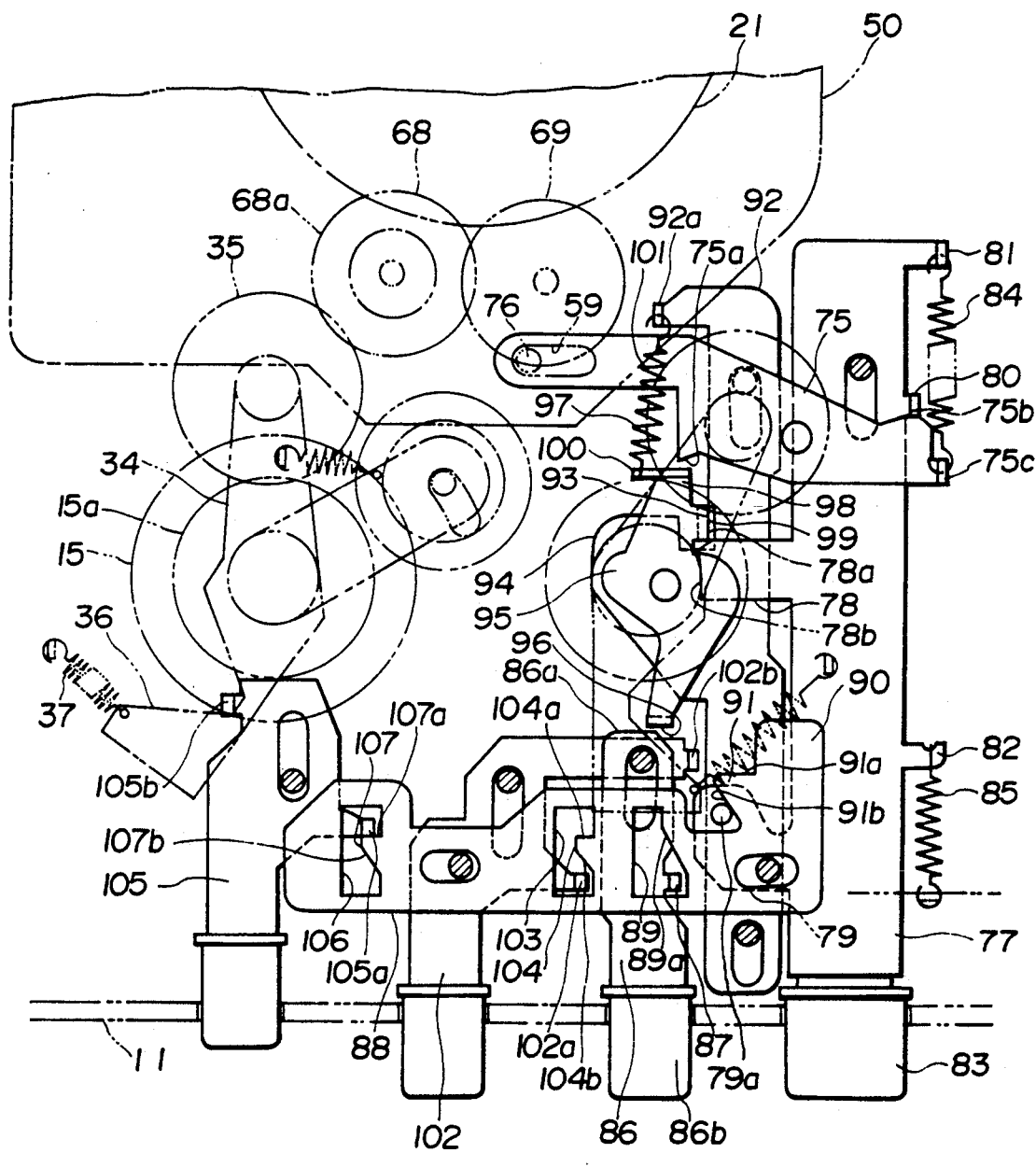
FIG. 23 is a schematic plan view of the recording and/or reproducing apparatus when it operates in a fast-forward mode.

The locked piece 105a of the FF lever 105 is arranged within the through opening 106 of the lock lever 88. When the FF lever 105 is positioned at the not-pushed position as shown in FIG. 18, the locked piece 105a thereof is arranged in front of the thrusted edge 107b of the locking claw 107, i.e. the locked piece 105a faces the thrusted edge 107b. When the FF lever 105 is pushed rearwards, the thrusted edge 107b of the locking claw 107 is urged by means of the thrusted piece 105a so that the lock lever 88 moves to the right. Then, the FF lever 105 reaches the pushed position as shown in FIG. 23, the locked piece 105a disengages from the thrusted edge 107b to be arranged behind the thrusted edge 107b, and the lock lever 88 moves to the left due to the biasing force applied thereto, so that the locking edge 107a is arranged in front of the locking piece 105a. As a result, if the force for pushing the FF lever 105 rearwards is removed, the locked piece 105a engages the locking edge 107a, so that the FF lever 105 is locked at the pushed position.

When the FF lever 105 moves from the not-pushed position to the pushed position, the thrusting piece 105b moves in the rearward direction of the cam edge 36 of the FF gear arm 34 to allow the FF gear arm 34 to rotate clockwise due to the spring force of the tension spring 37, so that the FF gear 35 mates with the relay gear 68. On the other hand, when the FF lever 105 returns from the pushed position to the not-pushed position, the thrusting piece 105b urges the cam edge 36 of the FF gear arm 34 in the forward direction, so as to cause the FF gear arm 34 to rotate counterclockwise against the spring force of the tension spring 37, so that the FF gear 35 disengages from the relay gear 68.

Operation

The operation of the tape player to which the preferred embodiment of a cassette holder, according to the present invention, can be applied, is schematically described below.

Figure 21:
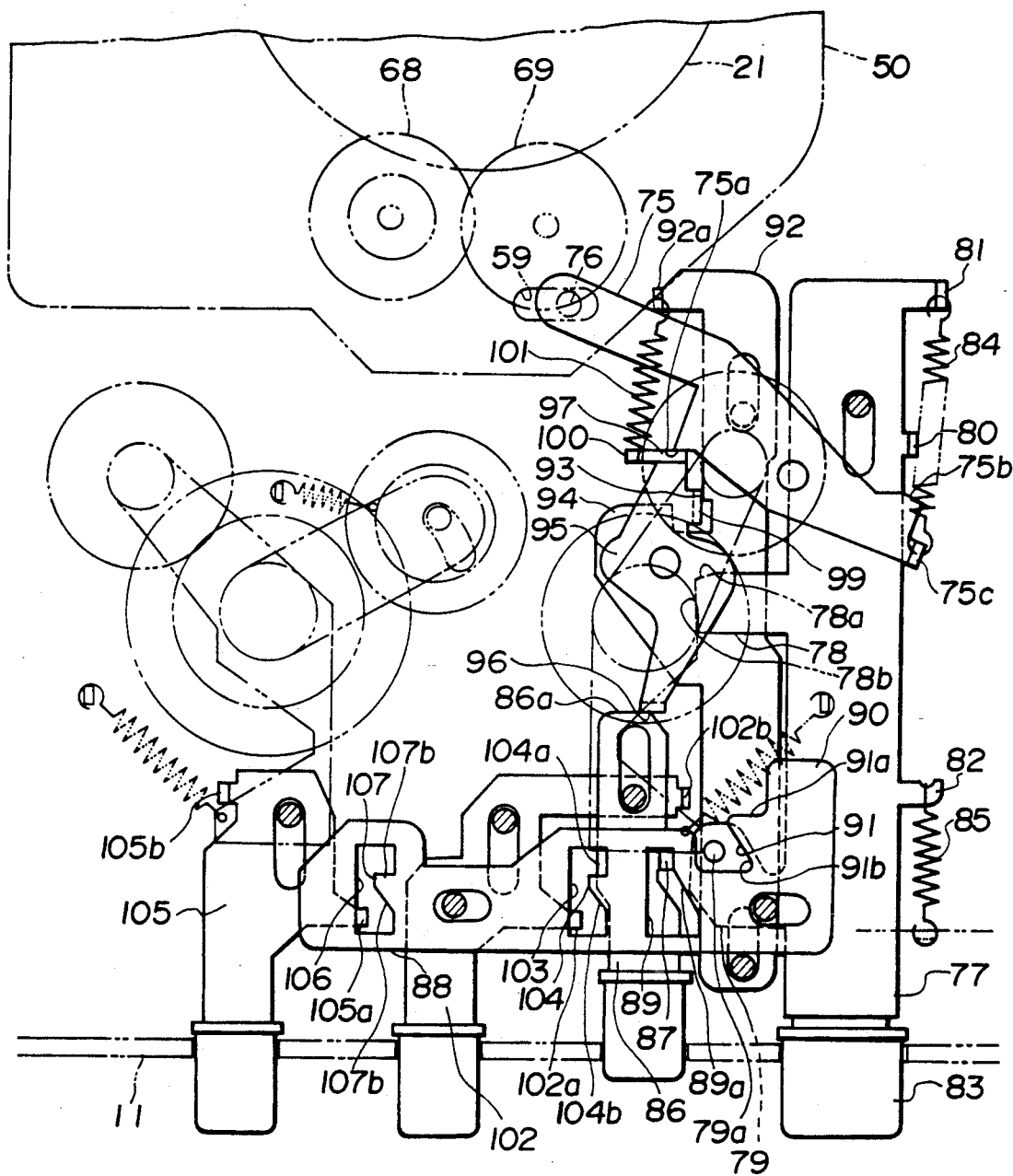
FIG. 21 is a schematic plan view of the recording and/or reproducing apparatus in an ejected condition.

In a case where the tape cassette 1 is loaded in the tape player, first of all, the STOP/EJECT lever 86 is pushed. When this lever is pushed, the thrusting edge 86a of the STOP/EJECT lever 86 pushes the thrusted piece 96 of the relay lever 95 rearward, so that the relay lever 95 moves rearward together with the supporting lever 92. When the relay lever 95 moves rearward, the thrusting piece 97 of the relay lever 95 pushes the thrusted portion 75a of the drum moving lever 75 rearward, so that the drum moving lever 75 rotates clockwise. As a result, the drum base assembly 50 moves rearward, so that the head drum unit 21 moves to the third position. When the head drum unit 21 moves to the third position, the locking of the cassette holder 44 is removed, so that the cassette holder 44 moves to the ejected position as shown in FIG. 21 by means of the biasing means (not shown).

When the tape cassette 1 is inserted into the cassette holding portion 44a of the cassette holder 44 positioned at the ejected position, the front lid 10 of the tape cassette 1 moves to its open position. Furthermore, the tape cassette 1 can be used upside down, and if the tape cassette 1 is inserted into the cassette holding portion 44a upside down, the front lid 10 oppositely to assume the open position as previously described. Recording on the magnetic tape 4 is performed by forming an inclined recording track on one of two regions which are formed by dividing the magnetic tape 4 into two regions in the lateral direction thereof, by so-called helical scan.

When the cassette holder 44 into which the tape cassette 1 is inserted rotates downwards to move the cassette loaded portion 27, the tape cassette 1 reaches its loaded position. Since the locking of the head drum unit 21 in the third position is removed when the tape cassette 1 reaches its loaded position, the drum moving lever 75 rotates counterclockwise due to the spring force of the tension spring 84 until the stopper edge 75b comes into contact with the stopper piece 80 of the PLAY lever 77, so that the head drum 21 reaches the second position. This condition as shown in FIG. 18 is a stop condition (a stop mode). In this condition, the relay gears 68 and 69 are separated from the play gear 30, the FF gear 35 and the REW gear 39.

In this condition, when the FF lever 105 is moved to the pushed position, as shown in FIG. 23, the FF gear 35 mates with the large-diameter gear 68a of the relay gear 68, and the drum motor 64 of the head drum unit 21 rotates. In this way, the FF mode in which the reel table 14 rotates at a high-speed in the tape playing direction, is formed.

Figure 22:
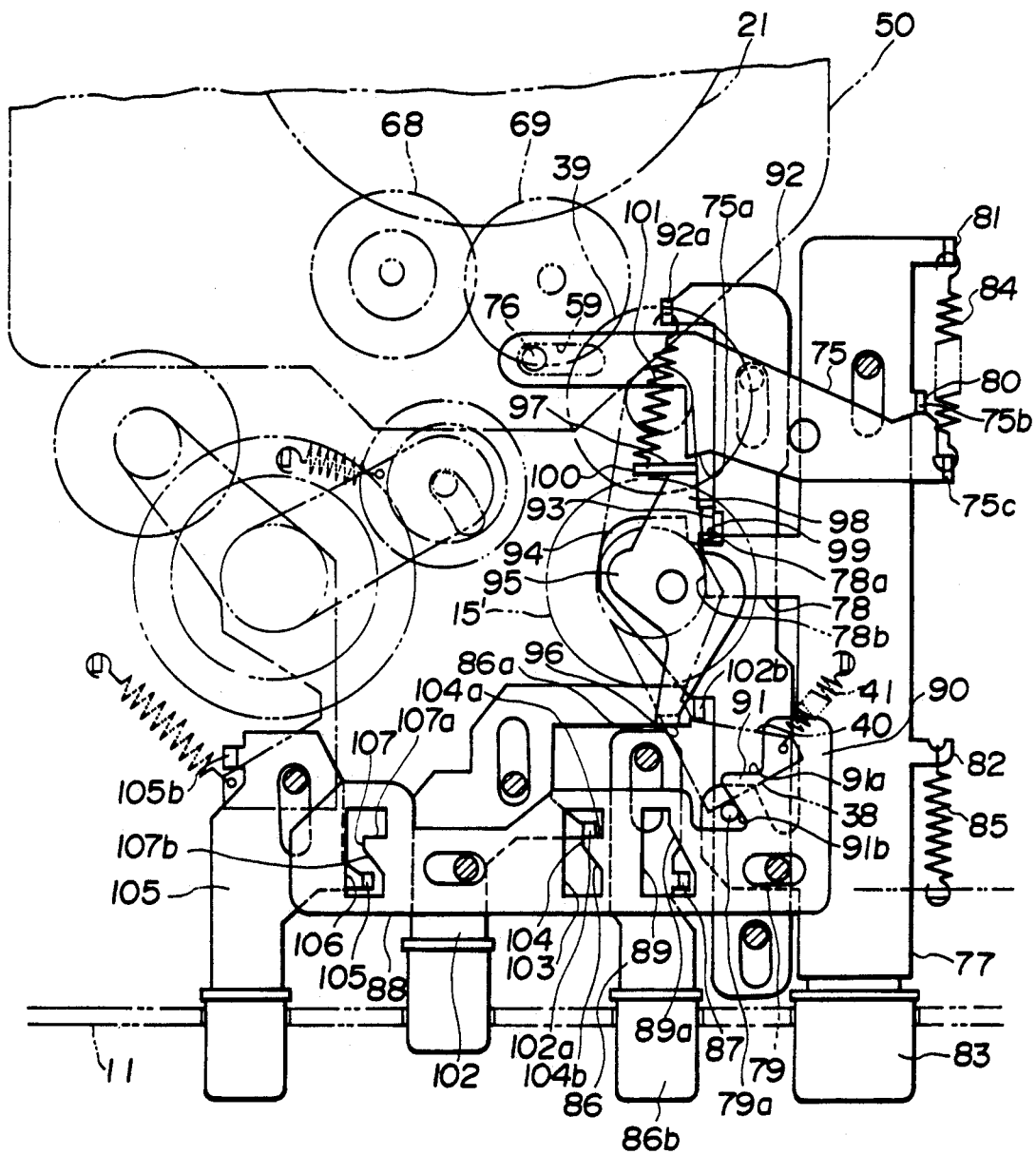
FIG. 22 is a schematic plan view of the recording and/or reproducing apparatus when it operates in a rewind mode.

In the aforementioned stop condition, when the REW lever 102 is moved to the pushed position, as shown in FIG. 22, the REW gear 39 mates with the relay gear 69, and the drum motor 64 rotates. In this way, the REW mode in which the reel table 13 rotates at a high-speed in the tape rewind direction, is formed.

In addition, when the head drum unit 21 is positioned at the second position, the magnetic heads 23 moves while they come lightly in contact with the magnetic tape 4. Therefore, similar to the aforementioned FF and REW modes, the search mode in which the magnetic tape 4 travels at high-speed while the magnetic heads 23 read signals from the magnetic tape 4.

Furthermore, the operation mode of the recording and/or reproducing apparatus can be directly changed into the aforementioned high-speed traveling modes and search mode from modes other than the stop mode. That is, since the lock lever 88 is moved to the unlocking direction when the FF lever 105 or the REW lever 102 is pushed, the preceding mode is removed, and the other mode is engaged by pushing the FF lever 105 or the REW lever 102.

Next, when the PLAY lever 77 is moved to the pushed position, the head drum unit 21 is moved to the first position as mentioned above, and small-diameter gear 68b of the relay gear 68 mates with the large-diameter gear 30a of the play gear 30. At this time, the play gear arm 29 rotates slightly clockwise so that the tension spring 33 expands, thereby the small-diameter gear 68b of the relay gear 68 engages. As a result, the drum motor 64 rotates, and the reel table 14 rotates in the tape play direction, so that the recording and/or reproduction mode is engaged.

This recording and/or reproducing mode is removed when the STOP/EJECT lever 86, the REW lever 102 or the FF lever 105 is pushed, and the operation mode of the recording and/or reproducing apparatus is changed in accordance with operations of the respective levers.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A cassette holder in a recording and/or reproducing apparatus for a magnetic tape cassette which has a resilient front pivotal closure member movable between a closed position at which the front pivotal closure member covers a front opening of said magnetic tape cassette, and an open position at which the front pivotal closure member opens the front opening, said cassette holder comprising:

holding means for receiving and holding said magnetic tape cassette at a fixed position within a cassette receptacle defined therein, said holding means being movable between an ejected position at which said magnetic tape cassette is allowed to be inserted into and removed from said holding means, and a loaded position at which cassette loading is completed;

opening means for deflecting said front pivotal closure member to the open position depending upon movement of said magnetic tape cassette toward said fixed position while said opening means is in contact with said front pivotal closure member; and closing means for deflecting said front pivotal closure member to the closed position depending upon movement of said magnetic tape cassette in a direction away from said fixed position while said closing means is in contact with said front pivotal closure member, wherein said resilient front pivotal closure member is slightly deformed while being pivotally opened to said open position whereby said front pivotal closure member remains in said open position without the use of any separate biasing means.

2. A cassette holder as set forth in claim 1, wherein said opening means includes an essentially circular-arc shaped member integrally formed with the cassette holder, a free end portion of said front pivotal closure member moving along the circular-arc shaped member in accordance with movement of said magnetic tape cassette toward said fixed position.

3. A cassette holder as set forth in claim 2, wherein said closing means includes a plate member which is integrally formed with the cassette holder so as to project essentially perpendicular to a major plane of the magnetic tape cassette held at the fixed position, and to face a free end portion of said front pivotal closure member of the magnetic tape cassette held at the fixed position, said plate member coming into contact with said free end portion to deflect said front pivotal closure member to the closed position when said magnetic tape cassette moves away from the fixed position to be taken out of the cassette holder.

4. A cassette holder as set forth in claim 3, wherein said holding means comprises at least two sheet metal members which are connected to each other to define therein said cassette receptacle.

5. A cassette holder as set forth in claim 4, wherein one of the sheet metal members is thicker than the other sheet metal member.

6. A cassette holder as set forth in claim 4, wherein said circular-arc shaped member is integrally formed with one of said sheet metal members, and said plate member is integrally formed with the other sheet metal member.

7. A cassette holder as set forth in claim 6, wherein a space for receiving therein said front pivotal closure member of the magnetic tape cassette arranged at the fixed position, is formed between said plate member and said circular-arc shaped member.

8. A cassette holder as set forth in claim 1, wherein said closing means includes a plate member which is integrally formed with the cassette holder so as to project essentially perpendicular to a major plane of the magnetic tape cassette held at the fixed position, and to face a free end portion of said front pivotal closure member of the magnetic tape cassette held at the fixed position, said plate member coming into contact with said free end portion to deflect said front pivotal closure member to the closed position when said magnetic tape cassette moves away from the fixed position to be taken out of the cassette holder.

9. A cassette holder as set forth in claim 1, wherein said holding means comprises at least two sheet metal members which are connected to each other to define therein said cassette receptacle.

10. A cassette holder as set forth in claim 9, wherein one of the sheet metal members is thicker than the other sheet metal member.

11. A cassette holder in a recording and/or reproducing apparatus for a magnetic tape cassette, said magnetic tape cassette having a resilient front pivotal closure member moving between a first position covering a front portion of said cassette and a second position uncovering the front portion of said cassette, the cassette holder comprising:
  a) holding means for receiving and holding a magnetic tape cassette, said holding means being movable between an ejected position allowing insertion of said cassette, and a loaded position where cassette loading is completed;
  b) opening means including an arcuate member, said arcuate member capable of engaging and moving a front, pivotal closure member of a cassette to an open position as said cassette is inserted into said holding means; and
  c) closing means, spaced from said opening means, for deflecting said front pivotal closure member to a closed position as the cassette is removed from said holding means,
  wherein said front pivotal closure member is slightly deformed while being opened to said open position whereby said front pivotal closure member remains in said open position without the use of any separate biasing means.

* * * * *